(12) United States Patent
Hubalek et al.

(10) Patent No.: US 9,031,749 B2
(45) Date of Patent: May 12, 2015

(54) CULTIVATION AIR SEEDER HAVING SEQUENTIALLY OPERATED TOOLS

(75) Inventors: Verne A. Hubalek, Lindsborg, KS (US); Jacob R. Riffel, Salina, KS (US)

(73) Assignee: Great Plaines Manfacturing, Inc., Salina, KS (US)

( * ) Notice: Subject to any disclaimer, the term of this patent is extended or adjusted under 35 U.S.C. 154(b) by 373 days.

(21) Appl. No.: 13/157,943

(22) Filed: Jun. 10, 2011

(65) Prior Publication Data
US 2012/0316736 A1 Dec. 13, 2012

(51) Int. Cl.
| G06F 7/70 | (2006.01) |
| G06F 19/00 | (2011.01) |
| G06G 7/00 | (2006.01) |
| G06G 7/76 | (2006.01) |
| A01B 79/00 | (2006.01) |
| A01C 7/08 | (2006.01) |
| A01C 7/10 | (2006.01) |

(52) U.S. Cl.
CPC .............. *A01B 79/005* (2013.01); *A01C 7/081* (2013.01); *A01C 7/102* (2013.01)

(58) Field of Classification Search
USPC .......................................................... 701/50
See application file for complete search history.

(56) References Cited

U.S. PATENT DOCUMENTS

| 4,454,919 | A | * | 6/1984 | Arnold et al. ...................... 172/1 |
| 5,232,054 | A | | 8/1993 | Van Blaricon et al. |
| 5,524,560 | A | * | 6/1996 | Carter ........................... 111/200 |
| 5,653,292 | A | * | 8/1997 | Ptacek et al. ....................... 172/4 |
| 5,899,950 | A | * | 5/1999 | Milender et al. ................. 701/50 |
| 5,961,573 | A | * | 10/1999 | Hale et al. ......................... 701/50 |
| 6,003,455 | A | * | 12/1999 | Flamme et al. ................ 111/200 |
| 6,044,916 | A | | 4/2000 | Hundeby |
| 6,070,539 | A | * | 6/2000 | Flamme et al. ................ 111/177 |
| 6,085,134 | A | * | 7/2000 | Adam .............................. 701/50 |
| 6,089,743 | A | * | 7/2000 | McQuinn ....................... 700/240 |
| 6,105,679 | A | * | 8/2000 | Schubert et al. ................... 172/4 |
| 6,141,612 | A | * | 10/2000 | Flamme et al. .................. 701/50 |
| 6,144,910 | A | * | 11/2000 | Scarlett et al. ................... 701/50 |
| 6,189,465 | B1 | * | 2/2001 | Burns et al. ...................... 111/33 |
| 6,308,645 | B1 | | 10/2001 | Newkirk et al. |
| 6,510,367 | B1 | * | 1/2003 | McQuinn ....................... 700/241 |

(Continued)

OTHER PUBLICATIONS

International Search Report and Written Opinion for PCT Patent Application No. PCT/US2012/041118, filed Jun. 6, 2012; Mailed: Dec. 26, 2012; 11 pages.

*Primary Examiner* — Nicholas Kiswanto
(74) *Attorney, Agent, or Firm* — Hovey Williams LLP

(57) ABSTRACT

When the operator of a cultivation air seeder shifts the tractor valve to raise the cultivators and openers from the ground as the seeder prepares to turn around at the end of a field, the operating and control system of the seeder causes the cultivators to be raised first, followed in sequence by the trailing openers. The seed meter turns off as soon as the cultivators leave their lowered position, but the blower stays on so that seeds in the conduits downstream from the meter continue to be delivered to and deposited into the ground by the openers until the cultivators reach their raised position, whereupon the openers are raised. Depending upon the particular seeding mode selected by the operator, the cultivators and openers either lower simultaneously as the operator shifts the tractor valve to the lowering position when starting down the next pass, or the cultivators are lowered first, followed in sequence by the openers. Regardless of the selected seeding mode, the seed meter turns on as soon as the cultivators reach their lowered positions.

10 Claims, 14 Drawing Sheets

(56) References Cited

U.S. PATENT DOCUMENTS

| | | |
|---|---|---|
| 6,688,245 B2 | 2/2004 | Juptner |
| 6,863,006 B2 * | 3/2005 | Sandoval et al. ............. 111/200 |
| 6,980,895 B2 * | 12/2005 | Paice et al. ...................... 701/50 |
| 7,502,678 B2 * | 3/2009 | Diekhans et al. ............... 701/50 |
| 7,686,095 B2 * | 3/2010 | Batthala et al. ................... 172/2 |
| 7,735,438 B2 * | 6/2010 | Riewerts ....................... 111/185 |
| 7,739,015 B2 * | 6/2010 | Senneff et al. .................. 701/50 |
| 8,186,288 B2 * | 5/2012 | Chinkiwsky .................. 111/200 |
| 8,346,442 B2 * | 1/2013 | Ryder et al. ..................... 701/50 |

\* cited by examiner

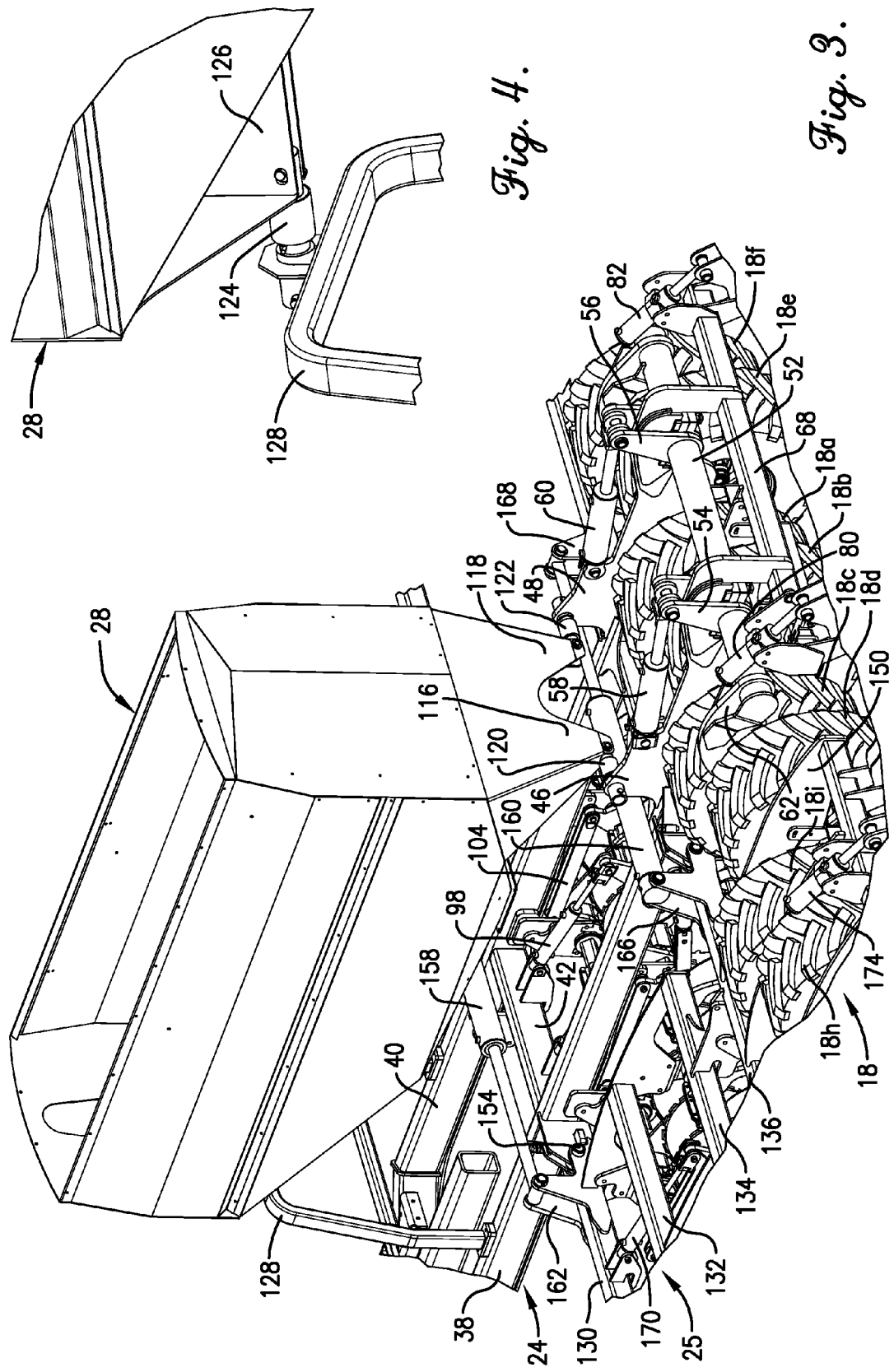

CULTIVATION AIR SEEDER HAVING SEQUENTIALLY OPERATED TOOLS

TECHNICAL FIELD

The present invention relates to cultivation air seeders and, more particularly, to improvements in the way in which the cultivators, the openers, and the seed meter of such machines may be controlled such as during turns at the end of the field or the like.

BACKGROUND AND SUMMARY

Conventional cultivation air seeders have cultivation tools (cultivators) near the front of the machine, such as discs and leveling tines, that prepare the soil for opener tools (openers) at the back of the machine that open furrows in the soil and deposit the seeds. Compacting wheels on the seeder are located between the cultivators and the openers for compacting the loosely cultivated soil just prior to engagement by the openers. A meter dispenses the seeds or other particulate material from a large bulk hopper on the seeder into an air stream that transports the seeds to the openers.

It is conventional practice for the operator to raise all the tools (discs, tines and openers) and turn off the meter as the seeder enters the headland area at the end of a field and turns around for the next pass. Once the seeder has started down the next pass, the tools are lowered back down to the ground and the meter is turned back on to resume seeding operations. By raising the openers at the same time as the cultivators and not turning off the seed meter, however, there is a risk of stopping the seeding too late and simply scattering seeds on the ground. By subsequently lowering the openers at the same time as the cultivators after the turn and not turning on the meter soon enough, there is a risk of resuming seed deposit too late, after traveling down the field for a distance.

Accordingly, the present invention provides a cultivation air seeder wherein the cultivators and the openers are caused to sequentially raise or lower, in appropriate coordination with activation or deactivation of the seed meter, in such a manner that seeding problems associated with headland turns and the like can be avoided. In one embodiment, when the operator operates the control lever in the tractor cab to raise the tools at an approaching turn or the like, the cultivators are raised first, followed by the openers after the cultivators have reached their raised position. Once the cultivators have left their lowered positions and are moving toward their raised position, the meter is turned off but the blower motor stays on so that seeds in the conduits downstream from the meter continue to be delivered to the openers and the openers continue to deposit them in the soil. By the time the cultivators reach their raised positions, the seeds have been emptied from the conduits and the openers are ready to be lifted to their raised positions. During the turn, both the cultivators and the openers remain in their raised positions, and the meter remains deactivated. After the turn, as the operator starts down the next pass and shifts the lever to lower the tools to the ground, the cultivators lower first. As the cultivators reach their lowered position, the blower motor is reactivated to start sending more seeds toward the openers and the openers commence their lowering movement. By the time the restarted seeds reach the openers, the openers have reached their lowered positions to once again start depositing seeds in the soil.

In another embodiment the cultivators and openers lift sequentially, as in the first embodiment, but lower simultaneously. The meter turns off when the cultivators start up toward their raised positions, and then turns back on when the cultivators have returned to their lowered positions.

In a most preferred embodiment the control system on the seeder enables the operator to select either one of the foregoing sequencing modes to suit his particular needs or desires.

BRIEF DESCRIPTION OF THE DRAWINGS

FIG. 3 is an enlarged, fragmentary left rear perspective view of the seed hopper of the seeder with ornamental panels removed;

FIG. 4 is an enlarged, fragmentary left rear perspective view of the front end of the seed hopper showing the load cell that mounts the front end of the hopper on the center frame section of the machine;

DETAILED DESCRIPTION

The present invention is susceptible of embodiment in many different forms. While the drawings illustrate, and the specification describes, certain specific embodiments of the invention, it is to be understood that such disclosure is by way of example only. The principles of the present invention are not limited to the particular disclosed embodiments.

Figure 1:
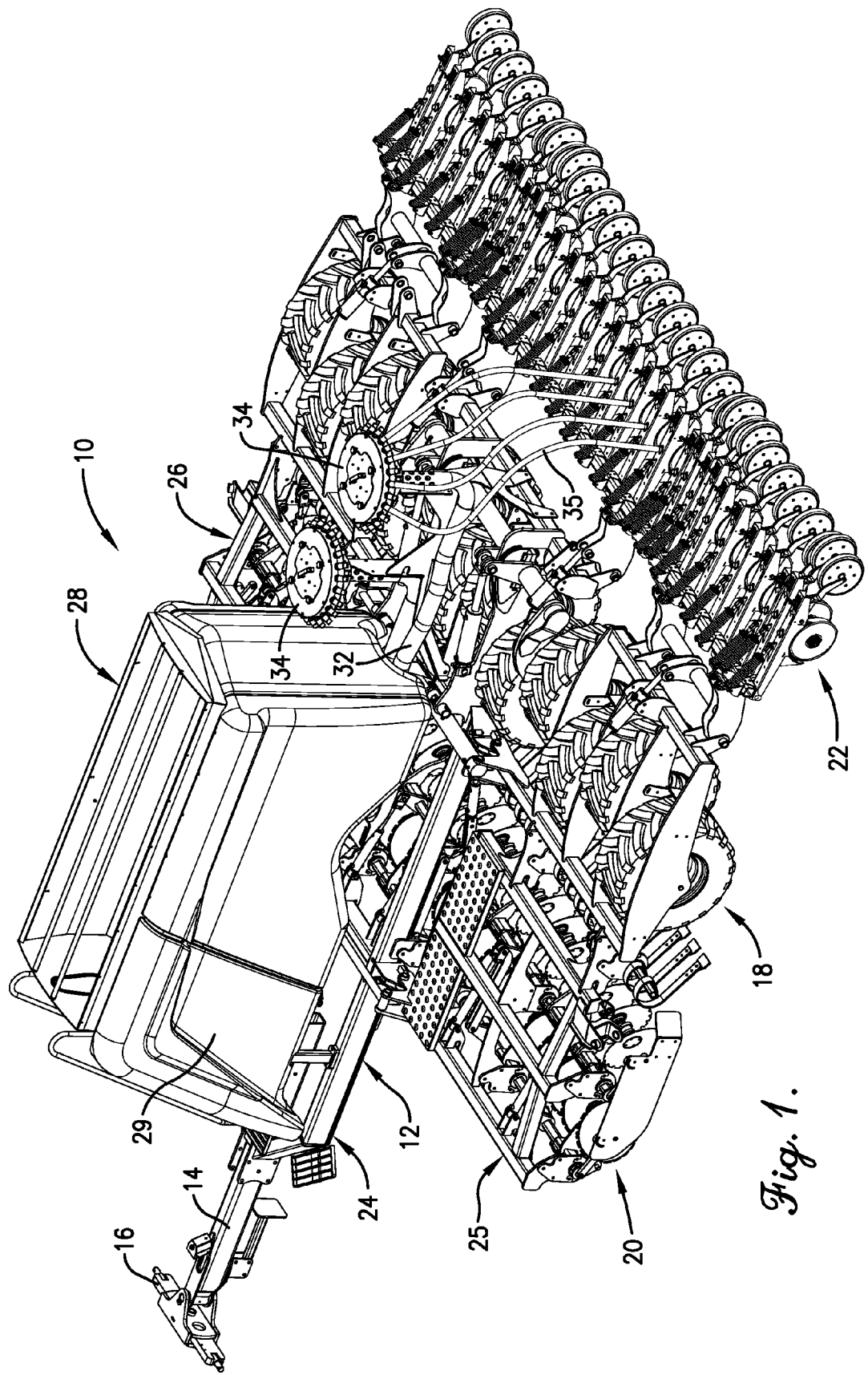
FIG. 1 is a left rear perspective view of an exemplary cultivation seeder constructed in accordance with the present invention.
Figure 2:
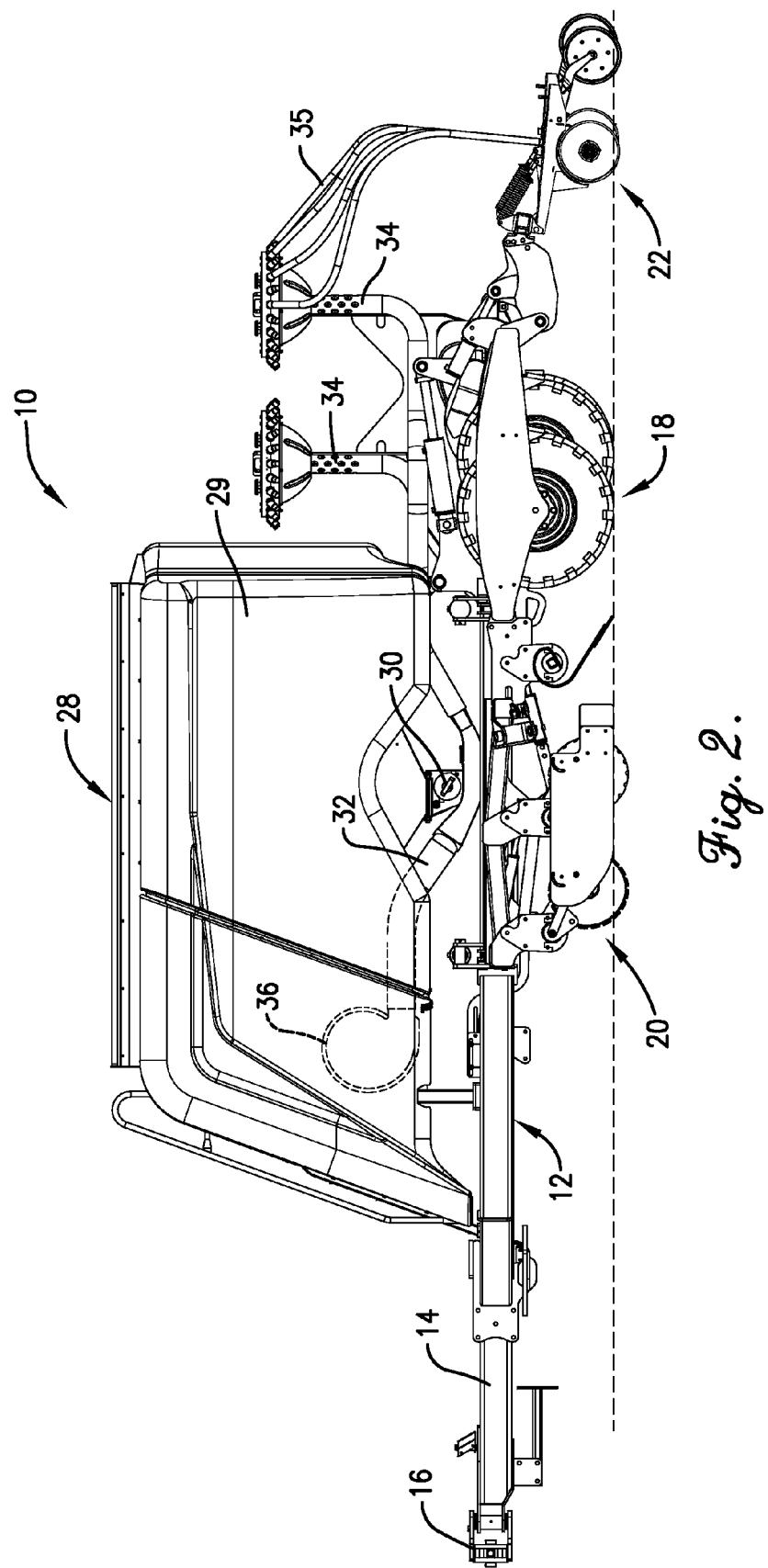
FIG. 2 is a left side elevational view of the seeder with the tools in a lowered field working position.
Figure 5:
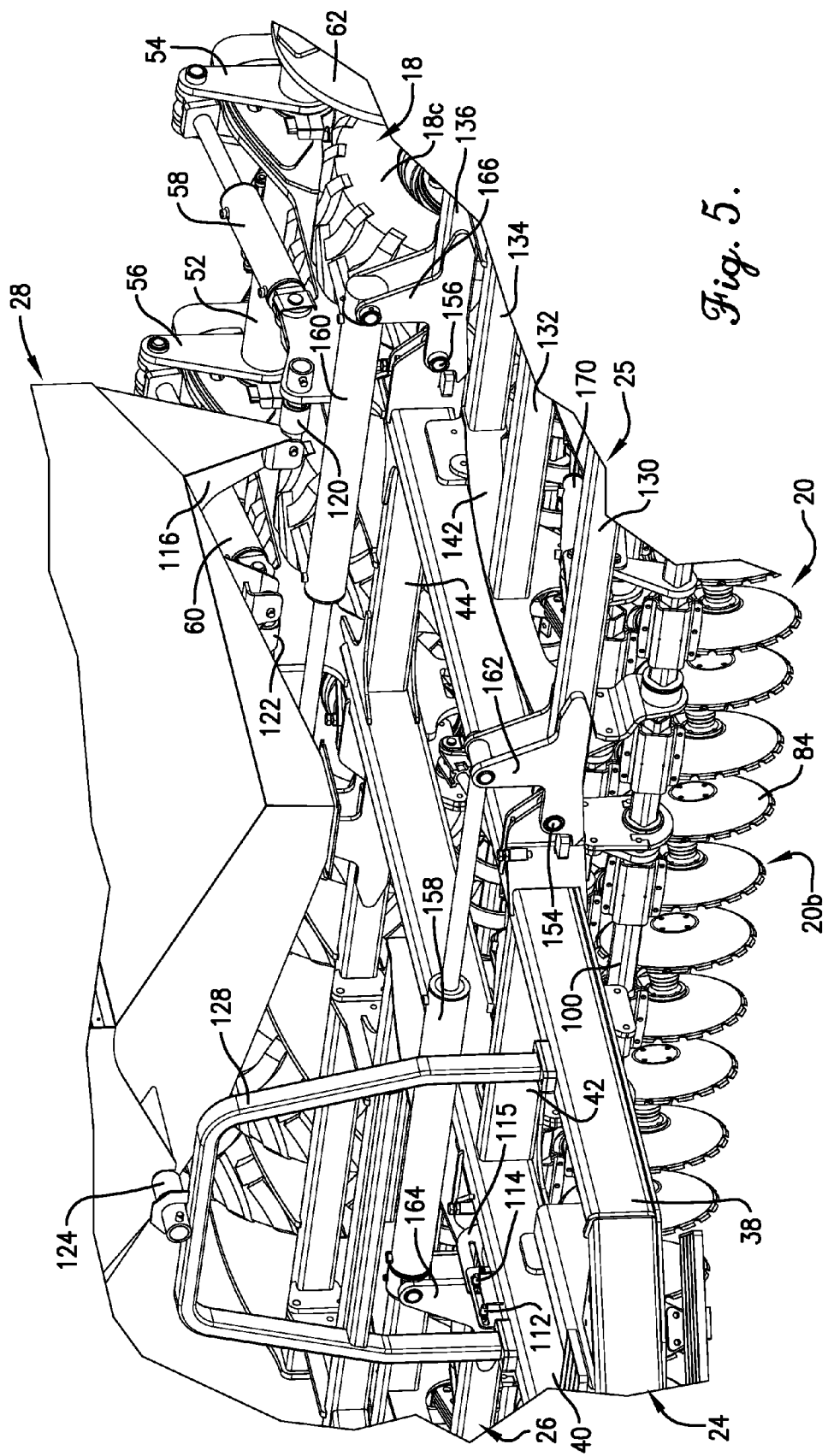
FIG. 5 is an enlarged, fragmentary left front perspective view of the seeder.
Figure 6:
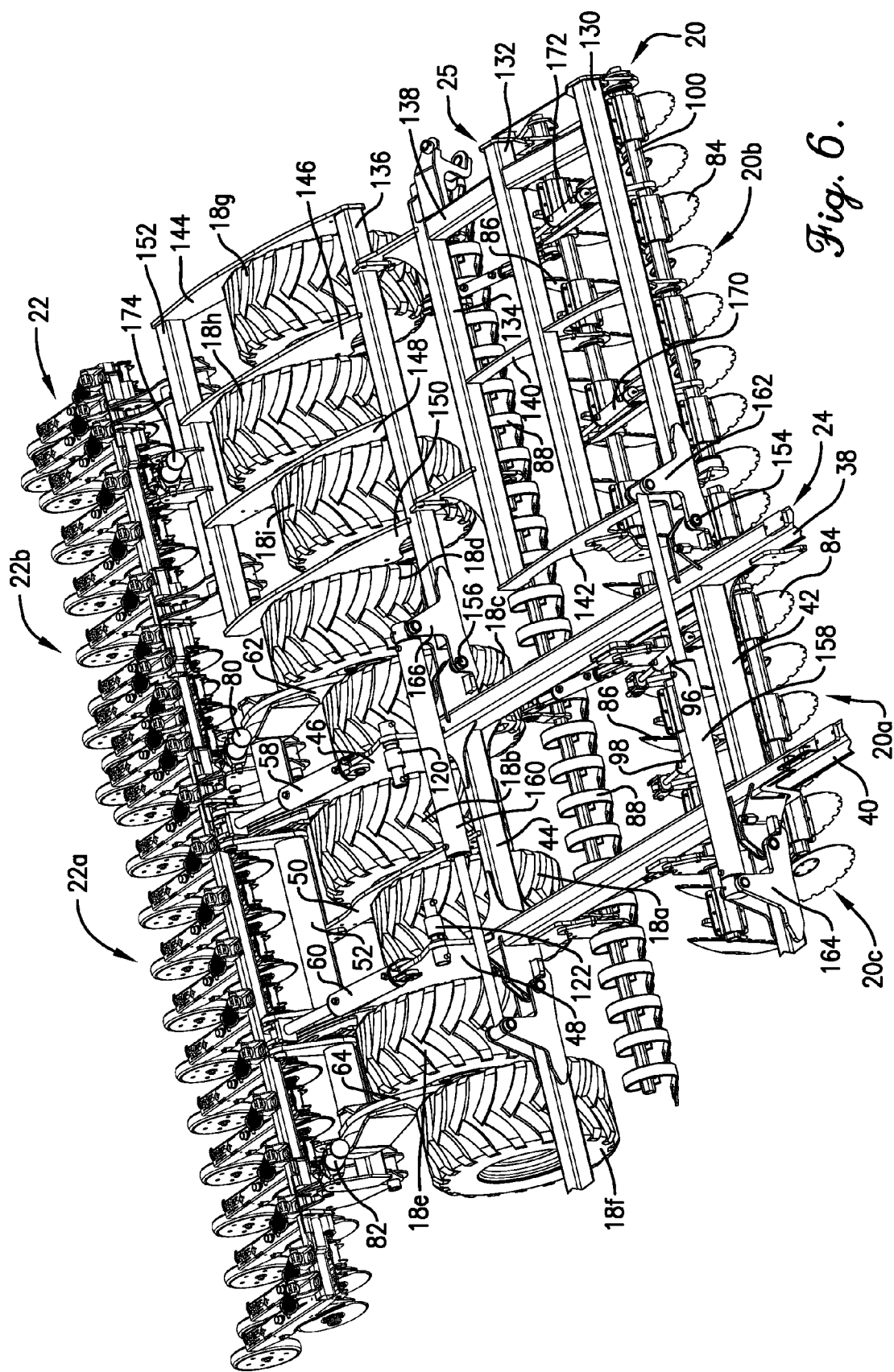
FIG. 6 is a fragmentary top right perspective view of the seeder with the hopper removed to reveal details of construction.
Figure 7:
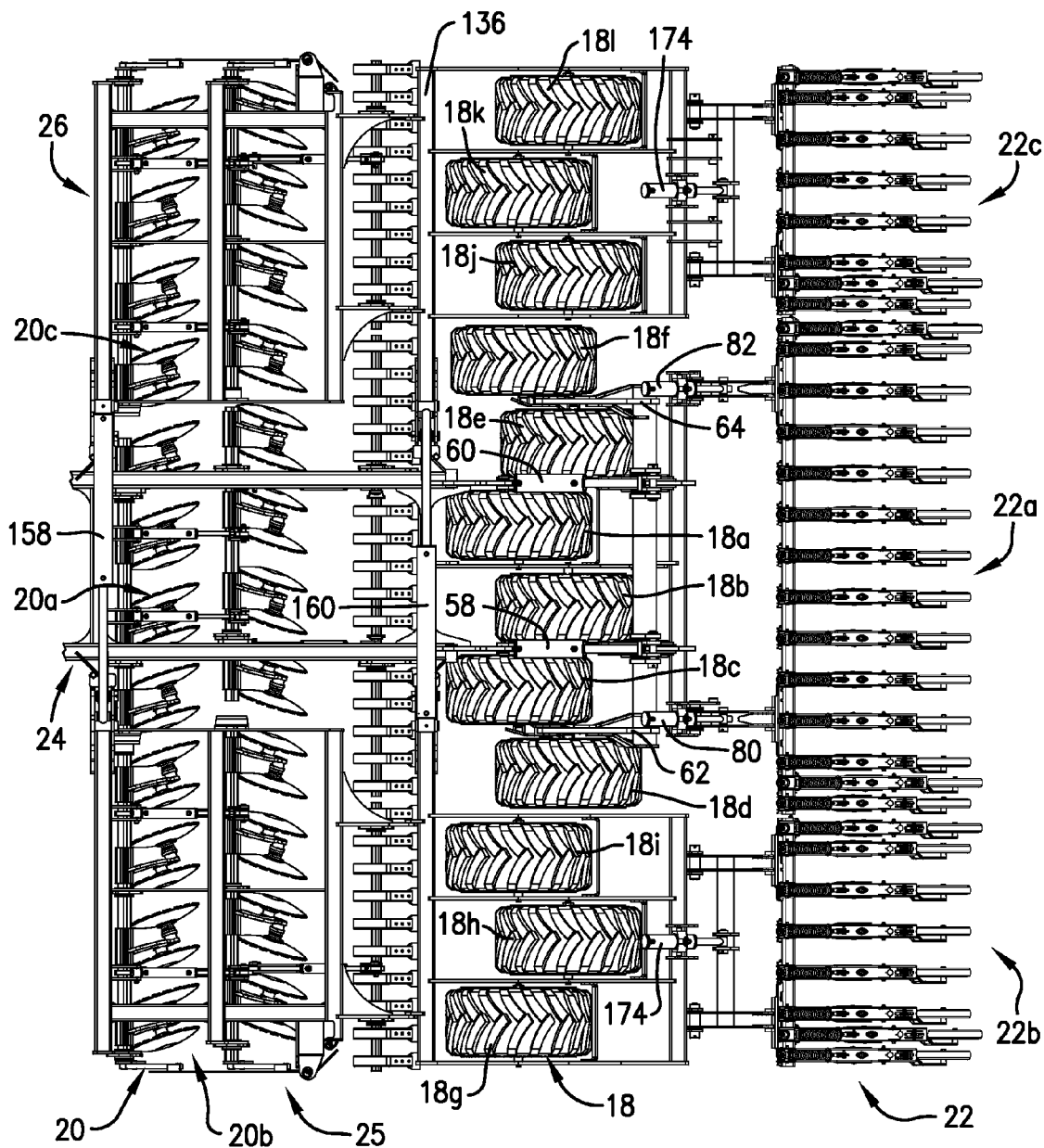
FIG. 7 is a fragmentary top plan view of the seeder with the hopper removed to reveal details of construction.
Figure 8:
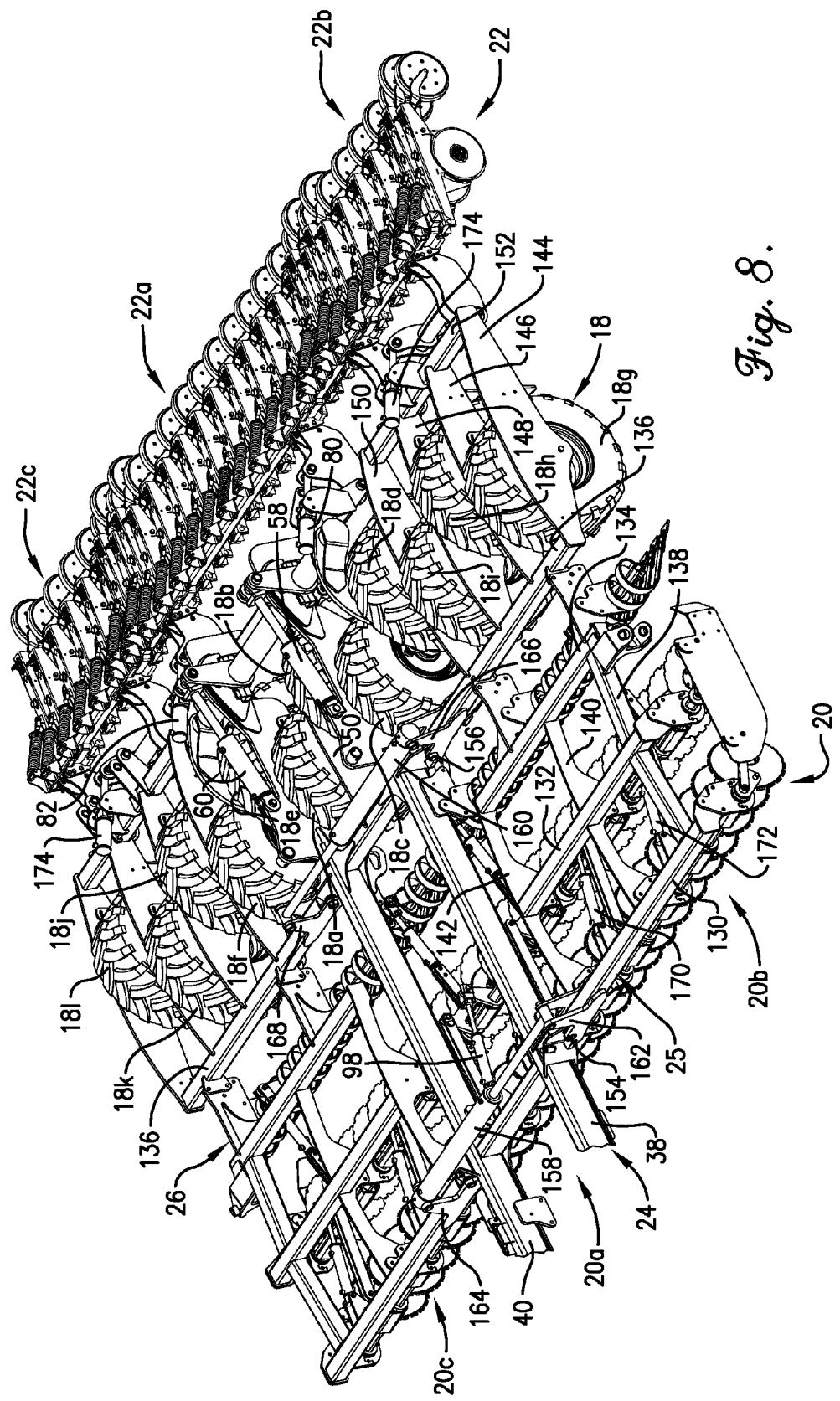
FIG. 8 is a fragmentary left front perspective view of the seeder with the hopper removed to reveal details of construction.
Figure 9:
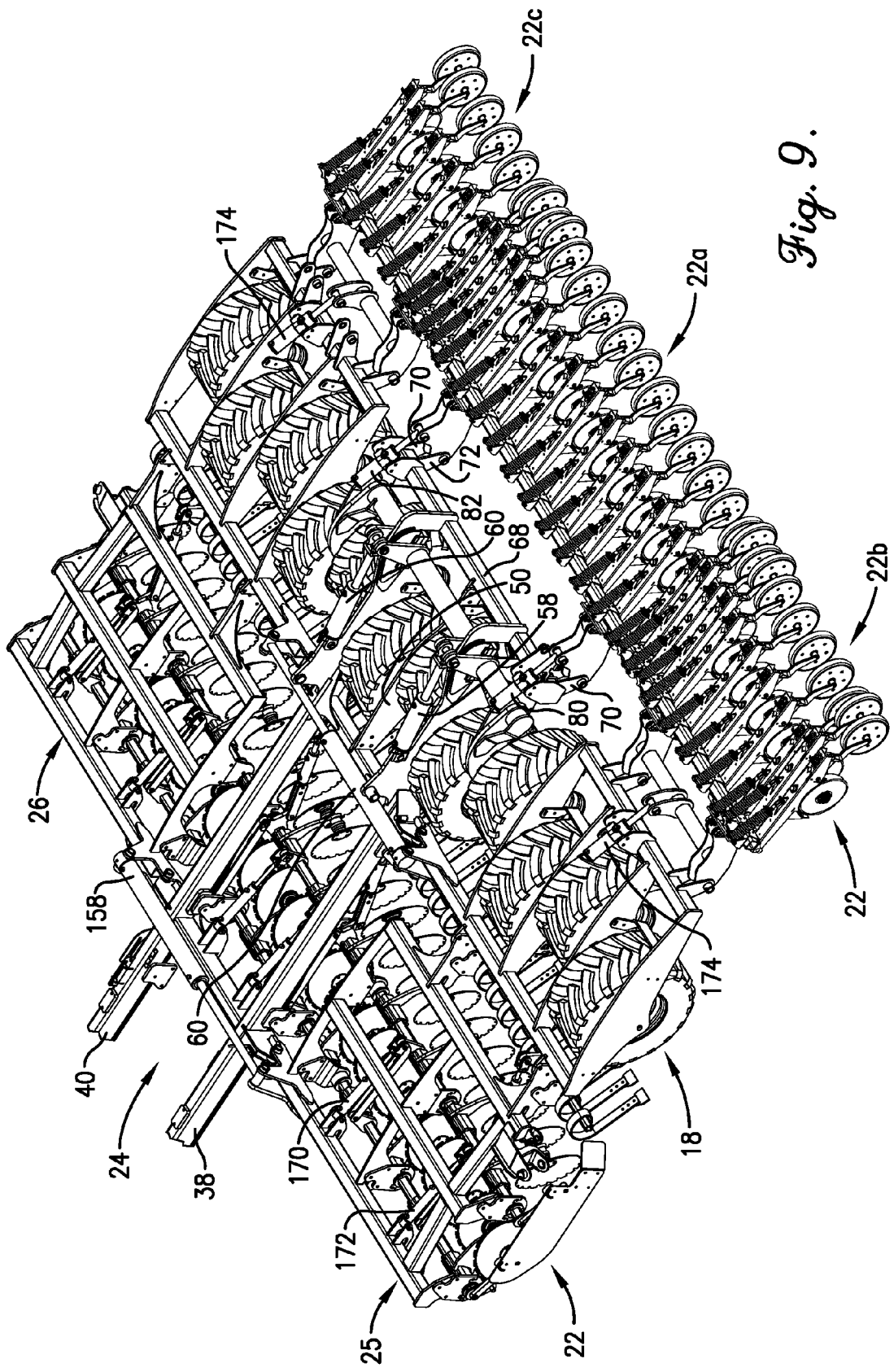
FIG. 9 is a fragmentary left rear perspective view of the seeder with the hopper removed to reveal details of construction.
Figure 10:
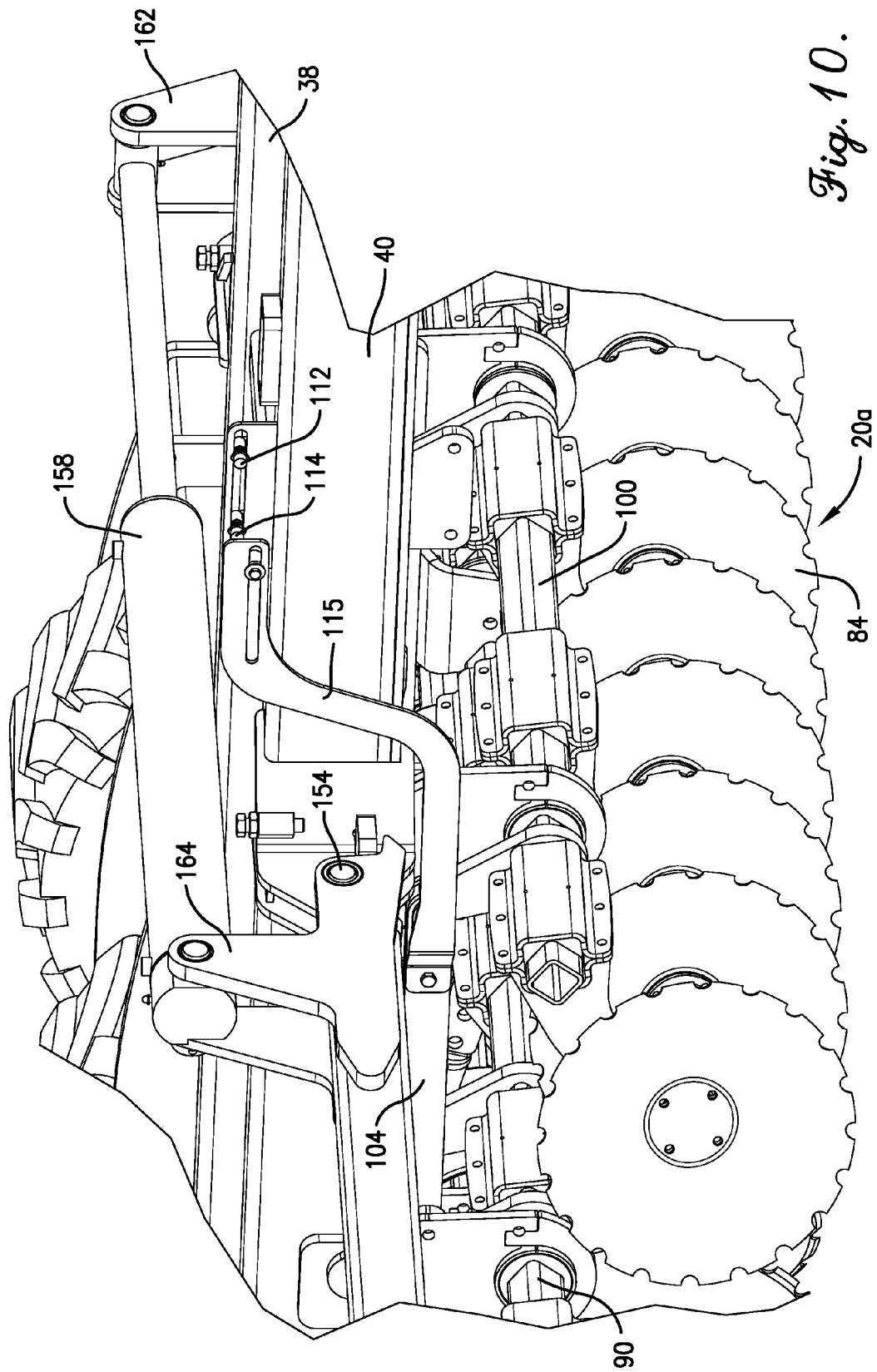
FIG. 10 is an enlarged, fragmentary, lower right front perspective view of the cultivator position sensors and the actuating structure therefor.
Figure 11:
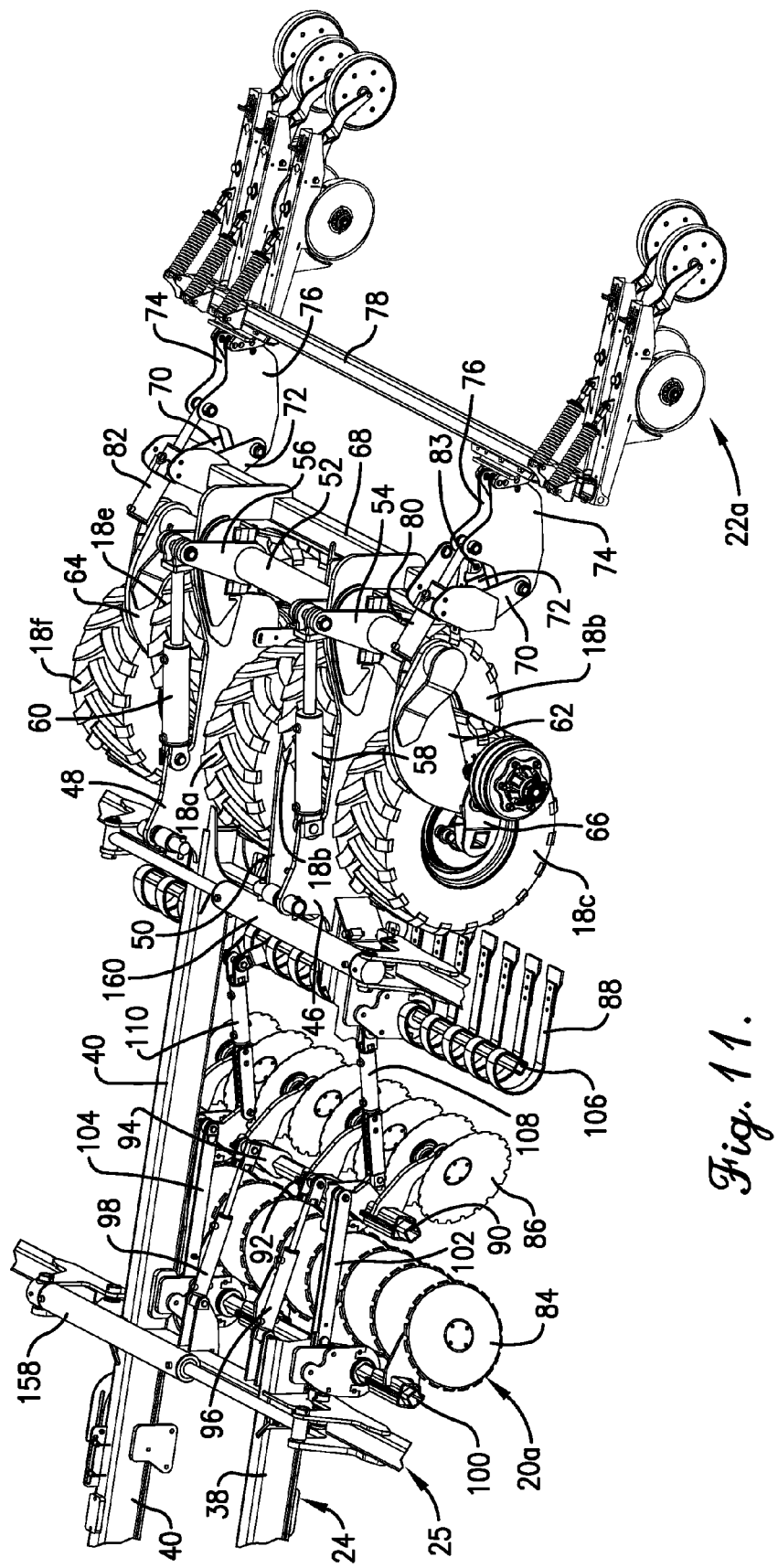
FIG. 11 is a fragmentary, left top perspective view of the center section of the seeder with the hopper removed to reveal details of construction.

With initial reference to FIGS. 1 and 2, an exemplary cultivation air seeder in accordance with the present invention is broadly denoted by the numeral 10 and is provided with a mobile chassis or frame 12 having a tongue 14 and hitch structure 16 for connecting seeder 10 to a suitable towing tractor or other vehicle (not shown). A number of ground-engaging support and compaction wheels 18 are disposed across the rear of frame 12 to support the frame for over-the-ground travel and for compacting the soil after it has been cultivated by cultivation tools 20 (cultivators) on frame 12 ahead of wheels 18. A row of furrow opening tools 22 (openers) of any suitable construction well known to those skilled in the art is supported across the rear of frame 12 behind wheels 18. In the illustrated embodiment, seeder 10 comprises a three-section machine, such that frame 12 has a main frame section 24 and pair of left and right wing frame sections 25, 26 respectively, although the number of frame sections is not of importance insofar as the principles of the present invention are concerned. When applied to various parts of the machine, the terms "left" and "right" are utilized as if the machine were being viewed from the rear, looking forwardly.

Seeder 10 further comprises a hopper 28 supported on main frame section 24 for holding a supply of seeds and/or fertilizer or other particulate materials to be distributed to openers 22. Although the illustrated embodiment of the invention will be described in connection with the holding and distribution of seeds by hopper 28, it will be appreciated that the principles of the present invention are not limited to seeds and may, in fact, be utilized in connection with many different kinds of particulate materials.

A meter 30 (FIG. 2) at the bottom of hopper 28 may be utilized to dispense seeds at a metered rate into one or more conduits 32 that transport the metered seeds within an airstream toward the rear of the machine. One or more distribution towers 34 are coupled with conduits 32 downstream from meter 30 for the purpose of dividing each primary stream of seeds into a multiplicity of secondary streams that flow to the openers 22 through hoses 35 (only a limited number being shown in the interest of clarity). Distribution towers 34 may advantageously take the form of the towers described and claimed in related application Ser. No. 13/157,890, titled "Seed Distribution Tower For An Air Seeder", assigned to the assignee of the present invention. A blower 36 (FIG. 2) adjacent the lower front end of hopper 28 supplies the transporting air for conduits 32 and secondary hoses 35.

Hopper 28 may be constructed in a variety of different shapes and sizes, and from a variety of different materials. In the illustrated embodiment, hopper 28 is constructed from sheet metal and is covered on three sides by an ornamental facing 29 of molded ABS plastic or the like, which is the subject of related application Ser. No. 13/157,856 titled "Cultivation Air Seeder With Visually Enhanced Seed Hopper", assigned to the assignee of the present invention.

Turning to FIGS. 3-11, the main or center frame section 24 is elongated in a fore-and-aft direction and is generally rectangular when viewed in plan. Fore-and-aft side beams 38, 40 are interconnected by a transverse beam 42 adjacent their fore-and-aft midpoint and are interconnected across their rear ends by a second transverse beam 44. Center frame section 24 further includes a pair of left and right upright support plates 46, 48 respectively that are fixed to rear transverse beam 44 and fore-and-aft beams 38, 40, substantially as rearwardly projecting extensions of beams 38, 40. A third support plate 50 (FIGS. 6-9) is also fixed to and projects rearwardly from rear transverse beam 44 midway between the plates 46, 48 in parallel relation therewith.

The two support plates 46, 48 and the intermediate plate 50 cooperate to rotatably support two staggered, fixed axle wheels 18*a* and 18*b* of the group of wheels 18. These two wheels 18*a*, 18*b* are not raisable or lowerable relative to the rest of center frame section 24 and provide part of the ground support and soil compaction for the rear of center frame section 24. Additional support and soil compaction for center frame section 24 is supplied by two pairs of staggered outboard wheels 18*c*, 18*d* and 18*e*, 18*f* that are vertically swingable relative to frame section 24 for causing the rear of frame section 24 to raise and lower. When outboard wheels 18*c*, 18*d* and 18*e*, 18*f* are lowered sufficiently by means yet-to-be-described, center frame section 24 and fixed wheels 18*a*, 18*b* become raised into a transport position, with fixed wheels 18*a*, 18*b* off the ground.

A transverse torque tube 52 is rotatably supported behind wheels 18*a*-18*f* by the two upright support plates 46, 48. Upstanding cranks 54, 56 are fixed to torque tube 52 adjacent support plates 46, 48 and are operably coupled at their upper ends to the rod ends of a pair of hydraulic cylinders 58, 60. The base ends of cylinders 58, 60 are connected to support plates 46, 48. For convenience, cylinders 58, 60 are hereinafter referred to as the "wheel cylinders."

Torque tube 52 is not operably coupled with fixed axle wheels 18*a*, 18*b*. However, at opposite outboard ends of torque tube 52, respective arched wheel arms 62, 64 are fixed thereto for rotation therewith when torque tube 52 is operated by wheel cylinders 58, 60. Wheel arms 62, 64 project forwardly and downwardly to join at their lower forward ends with respective walking beam assemblies 66 (FIG. 66) for each pair of raisable wheels 18*c*, 18*d* and 18*e*, 18*f*. Thus, the left pair of raisable wheels 18*c*, 18*d* is connected via a walking beam assembly 66 to the lower front end of wheel arm 62, while the right pair of raisable wheels 18*e*, 18*f* is connected by its own walking beam assembly 66 to the lower front end of wheel arm 64. Wheel pairs 18*c*, 18*d* and 18*e*, 18*f* are therefore raised and lowered relative to center frame section 24 by wheel cylinders 58, 60.

The center frame section 24 further includes a rear transverse beam 68 spaced below and slightly rearwardly of torque tube 52. Beam 68 is fixed to the lower rear ends of upright support plates 46, 48 and to the rearmost end of intermediate support plate 50. Two sets of lugs 70, 72 are fixed to beam 68 adjacent opposite ends thereof and project downwardly and slightly rearwardly therefrom to pivotally support a corresponding pair of rearwardly projecting links 74, 76. Links 74, 76 are fixed joined at their rearmost ends to a transverse toolbar 78 that supports a center gang 22*a* of the openers 22. A pair of hydraulic cylinders 80, 82 have their rod ends connected to links 74, 76 respectively and their base ends supported on upstanding structure fixed to transverse beam 68 for raising and lowering links 74, 76. Thus, when cylinders 80, 82 are actuated, they raise or lower the center gang of openers 22*a* relative to center frame section 24. For convenience, cylinders 80, 82 are hereinafter referred to as the "opener cylinders." As will be seen, opener cylinders 80, 82 are also utilized to apply down pressure to openers 22*a*. An opener down position sensor 83 (FIG. 11) in the nature of a proximity switch is mounted between one pair of the links 74, 76 and is covered and uncovered thereby for detecting when openers 22*a* are in their lowered position.

Center frame section 24 supports a center section 20*a* of the cultivation tools 20 (cultivators). Separate tool sections 20*b* and 20*c* are supported by wing frame sections 25 and 26 respectively. Although the cultivators 20 may take a variety of different forms without departing from the principles of the present invention, in the illustrated embodiment the tools comprise front and rear rows of oppositely obliquely angled discs 84 and 86 (FIG. 11), plus a row of leveling tines 88 behind rear discs 86. The rear row of discs 86 is supported on a transverse rockshaft 90 that is in turn rotatably supported by appropriate bearing means (not shown) on the underside of fore-and-aft beams 38, 40 of center frame section 24. Rockshaft 90 has a pair of upright lugs 92, 94 that are operably connected to the rod ends of a pair of corresponding hydraulic cylinders 96, 98 having their base ends attached to transverse beam 42 of center frame section 24. Thus, extension and retraction of cylinders 96, 98 result in rotating rockshaft 90 in the appropriate direction to correspondingly raise and lower discs 86. For convenience, cylinders 96, 98 are hereinafter referred to as the "cultivator cylinders" and may also be utilized to apply down pressure to the discs.

Like rear disc row 86, the discs 84 of the front row are mounted on a rockshaft 100 that is suitably rotatably mounted by bearing means (not shown) underneath fore-and-aft beams 38, 40 of center frame section 24. Two sets of fore-and-aft links 102, 104 operably interconnect rockshafts 90 and 100 so as to transfer the rotary motion of rockshaft 90 to rockshaft 100. Thus, actuation of cultivator cylinders 96, 98 results in simultaneous actuation of both sets of discs 84, 86. In a similar manner, the leveling tines 88 are mounted on their own rockshaft 106 that is bearing-supported for rotation about its longitudinal axis by suitable bearing means (not shown) beneath fore-and-aft beams 38, 40. A pair of hydraulic cylinders 108, 110 serve as motion-transmitting links between the rockshaft 96 of rear discs 86 and rockshaft 106 of tines 88 so that all the discs 84, 86 and leveling tines 88 of center frame section 24 raise and lower in unison. If need be, the position of tines 98 relative to discs 84, 86 can be adjusted somewhat by appropriately extending or retracting cylinders 108, 110. Otherwise, cylinders 108, 110 are not extended or retracted and serve only to operably couple the tines with the discs for conjoint operation thereof. A pair of cultivator position sensors 112, 114 (FIG. 10) are mounted on right fore-and-aft beam 40 of main frame section 24 for the purpose of detecting when cultivators 22 are in their raised position and their lowered position. Sensor 112 is the raised position sensor, while sensor 114 is the lowered position sensor, both of which are actuated by an elongated link 115 connected to motion-transmitting link 104.

Hopper 28 is supported on center frame section 24 in such a manner that the weight of hopper 28, and more particularly, the weight of its contents, can be continuously monitored and that information used to perform one or more control functions of the seeder. In this respect it will be noted that hopper 28 has a pair of downwardly and slightly rearwardly projecting, rigid legs 116 and 118 (FIG. 3) at opposite rear corners thereof. Each leg 116, 118 is mounted on and supported by the weigh bar of a corresponding transversely extending load cell 120, 122 that is in turn fixedly mounted on the corresponding upstanding support plate 46 or 48. At its front end hopper 28 is mounted on and supported by the weigh bar of a single, fore-and-aft extending load cell 124 (FIG. 4) that is fixedly connected at its rear end to a centrally located bracket assembly 126 of the hopper and at its front end to an upstanding, upwardly arched and transversely extending support member 128 that straddles beams 38, 40 of center frame section 24. Thus, hopper 28 is supported at three points by three load cells 120, 122, and 124 of the type that are well known to those skilled in the art. Satisfactory load cells of this type may be obtained from and programmed by a variety of suppliers such as, for example, Digi-Star LLC of Fort Atkinson, Wis.

The two wing sections 25 and 26 are substantially similar to one another in construction and operation, in some respects being mirror images of one another. Each wing section 25, 26 is somewhat generally L-shaped in plan, having a front, larger rectangular portion defined in part by four transverse beams 130, 132, 134, 136 and three fore-and-aft beams 138, 140, 142, and smaller, wheel-supporting rear rectangular portion defined in part by fore-and-aft, laterally spaced apart beams 144, 146, 148, and 150. Fore-and-aft beams 144-150 are fixed at their front ends to the outboard half of transverse beam 136, and at their rear ends to a shorter transverse beam 152 that is slightly more than one-half the length of beam 136. Three fixed axle wheels 18g, 18h, and 18i are supported in a staggered pattern by and between fore-and-aft beams 144-150 on left wing frame section 25, while a corresponding set of three fixed axle wheels 18j, 18k, and 18l are supported in a similar manner on right wing frame section 26. Although the inboard end of transverse beam 136 of each wing frame section 25, 26 passes in front of a corresponding pair of wheels 18c, 18d or 18e, 18f, such wheels 18c, 18d and 18e, 18f are not supported by or connected to beam 136. As explained above, such wheels 18c, 18d and 18e, 18f are vertically swingably mounted on the center frame section 24.

Each of the wing frame sections 25, 26 is rendered vertically swingable between a lowered operating position and a raised folded position by virtue of a pair of aligned, fore-and-aft pivots 154 and 156 (FIG. 8) connecting the inboard ends of beams 130 and 134, respectively, to fore-and-aft beams 38 or 40 of center frame section 24. Wheels 18g, 18h and 18i thus move up and down with wing frame section 25 during its raising and lowering, while wheels 18j, 18k and 18l move up and down with wing frame section 26 during its raising and lowering operations.

Raising and lowering of wing frame sections 25 and 26 is carried out by a pair of large, transversely extending hydraulic cylinders 158 and 160. Front cylinder 158 has its rod end pivotally coupled with an upstanding lug assembly 162 on the inner end of front beam 130 of left wing frame section 25 and its base end pivotally connected to an upstanding lug assembly 164 on the inner end of front beam 130 of right wing frame section 26. The rear cylinder 160 is inverted end-for-end from front cylinder 158 and has its base end pivotally connected to an upstanding lug assembly 166 on the inner end of beam 136 of left wing frame section 25 and its rod end pivotally connected to an upstanding lug assembly 168 on the inner end of beam 136 of right wing frame section 26. It will thus be seen that both of the cylinders 158, 160 are connected only to and between the wing frame sections 25, 26, and not to the center frame section 24. For convenience, cylinders 158, 160 will hereinafter be referred to as the "wing cylinders." As will be seen, in addition to providing a means of folding and unfolding wing frame sections 25, 26, wing cylinders 158, 160 can also be utilized to apply down pressure to the compaction wheels of wing frame sections 25, 26 in adjustable amounts.

Each of the wing frame sections 25, 26 carries cultivation tools of the same design and in the same manner as center frame section 24. Therefore, a detailed description of the tools on wing frame sections 25, 26 and their mounting arrangements is not necessary. Suffice it to point out that the discs 84, 86 and tines 88 of each wing frame section 25, 26 are raised and lowered in unison by a pair of cultivation cylinders 170, 172 in the same manner as cultivation cylinders 96, 98 on the center frame section 24. All of the cultivation cylinders 96, 98, 170, 172 are plumbed in parallel so that all of the cultivation tools 20 across the entire machine are raised or lowered in unison.

Each of the wing frame sections 25, 26 carries a gang of openers, the openers associated with the left wing frame section 25 being denoted by the numeral 22b and the openers associated with the right wing frame section 26 being denoted by the numeral 26c. Openers 22b and 22c are mounted on their respective wing frame sections 25 and 26 in substantially the same manner as the openers 22a on center frame section 24. Suffice it to point out, therefore, that each gang of openers 22b and 22c is raised and lowered by its own opener cylinder 174. All the opener cylinders 80, 82, 174 are plumbed in parallel for raising and lowering all the openers across the entire machine in unison.

The wheel cylinders 58, 60; opener cylinders 80, 82 and 174; cultivator cylinders 96, 98, and 170, 172; and wing cylinders 158, 160 all comprise part of what will hereinafter be referred to as a hydraulic operating circuit 176 of the machine. Operating circuit 176 also includes a number of electrically controlled valves and other components as illustrated in FIG. 12 for controlling fluid flow to and from such cylinders.

Figure 12:
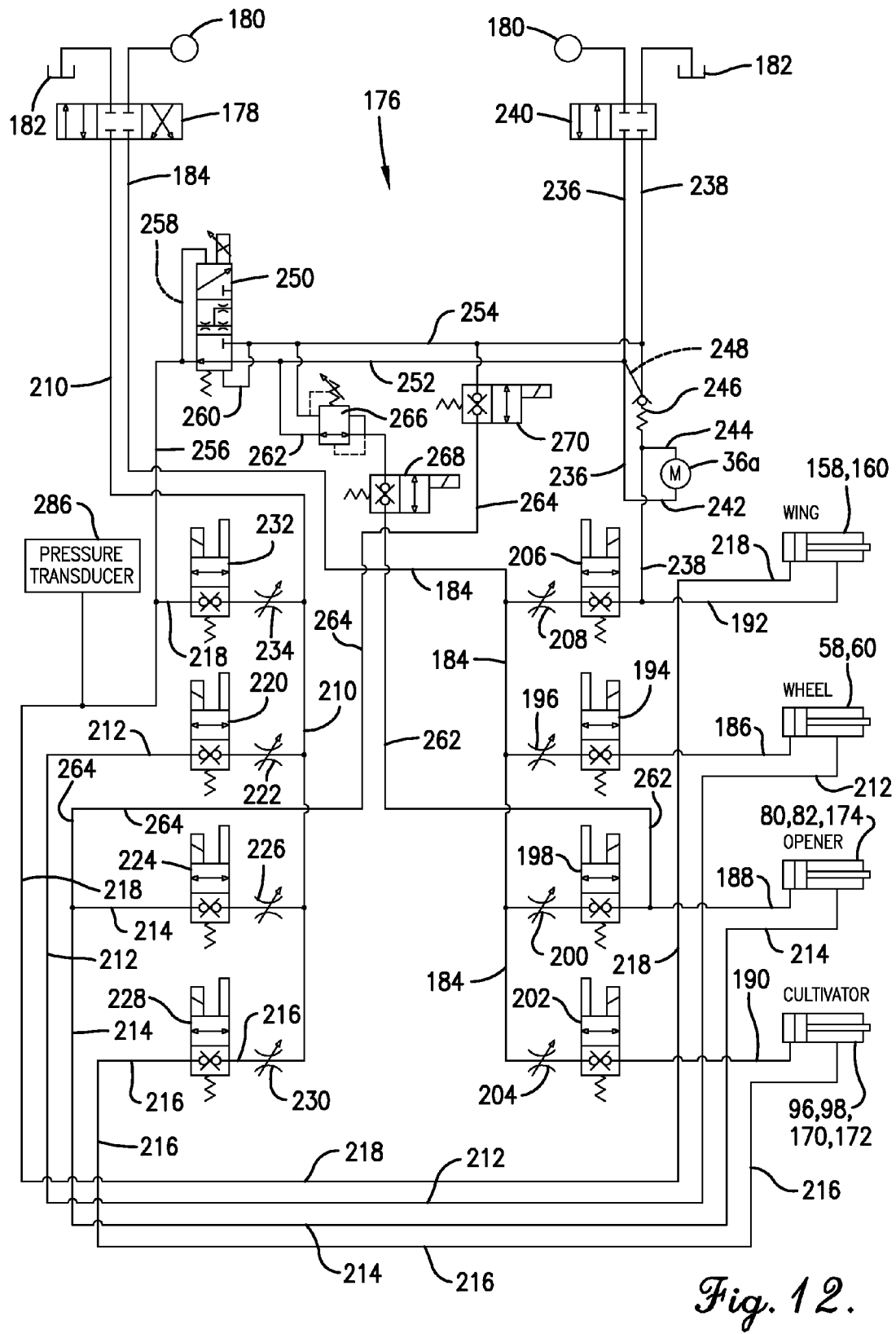
FIG. 12 is a schematic diagram of the hydraulic operating circuit of the seeder.

Referring to FIG. 12, operating circuit 176 is adapted to cooperate with a three-position valve 178 on the tractor (not shown) that is biased to a neutral position but may be manually shifted by the operator to either of two other selectable positions. The tractor also has a pump 180 and a tank 182 connected to valve 178.

Operating circuit 176 includes a main line 184 leading from tractor valve 178 and connected in parallel flow relationship with a plurality of branch lines 186, 188, 190, and 192. Branch lines 186, 188 and 190 respectively lead to the base ends of wheel cylinders 58, 60; opener cylinders 80, 82, 174; and cultivator cylinders 96, 98, 170, 172, while branch line 192 leads to the rod end of wing cylinders 158, 160. Wheel branch line 186 has a first normally closed, electrically actuable wheel solenoid valve 194, as well as a manually adjustable variable orifice 196 that is located between wheel valve 194 and main line 184; opener branch line 188 has a first normally closed, electrically actuable opener solenoid valve 198, as well as a manually adjustable variable orifice 200 that is located between opener valve 198 and main line 184; cultivator branch line 190 has a first normally closed, electrically actuable cultivator solenoid valve 202, as well as a manually adjustable variable orifice 204 that is located between cultivator valve 202 and main line 184; and wing branch 192 has a first normally closed, electrically actuable wing solenoid valve 206, as well as a manually adjustable variable orifice 208 that is located between wing valve 206 and main line 184.

Operating circuit 176 further includes a main line 210 leading from tractor valve 178 and connected in parallel flow relationship with a plurality of branch lines 212, 214, 216, and 218. Branch lines 212, 214, and 216 respectively connect with the rod ends of wheel cylinders 58, 60; opener cylinders 80, 82, 174; and cultivator cylinders 96, 98, 170, 172, while branch line 218 connects with the base ends of wing cylinders 158, 160. Wheel branch line 212 has a second normally closed, electrically actuable wheel solenoid valve 220, as well as a second manually adjustable variable orifice 222 that is located between wheel valve 220 and main line 210; opener branch line 214 has a second normally closed, electrically actuable opener solenoid valve 224, as well as a manually adjustable variable orifice 226 that is located between opener valve 224 and main line 210; cultivator branch line 216 has a second normally closed, electrically actuable cultivator solenoid valve 228, as well as a manually adjustable variable orifice 230 that is located between cultivator valve 228 and main line 210; and wing branch line 218 has a second normally closed, electrically actuable wing solenoid valve 232, as well as a manually adjustable variable orifice 234 that is located between wing valve 232 and main line 210.

Operating circuit 176 further includes a blower motor circuit comprising a main line 236 and a main line 238 that are controlled by a second tractor valve 240 connected to pump 180 and the tank 182. The blower 36 of the seeder is driven by a rotary hydraulic motor 36a that is connected to main line 236 by a blower branch line 242 and to main line 238 by a blower branch line 244. Main line 238 connects to wing branch line 192, and a pilot-operated check valve 246 in main line 238 prevents flow from wing branch line 192 through main line 238 when wing valve 206 is open for pressurizing the rod ends of wing cylinders 158, 160. Normally closed check valve 246 is openable by pressure in main line 236 via a pilot line 248.

Operating circuit 176 additionally includes an electro-proportional, three-position pressure reducing valve 250 connected to main line 236 of the blower motor circuit via a line 252 and to main line 238 of the blower motor circuit via a line 254. Pressure reducing valve 250 is also connected to wing branch line 218 via a line 256. Pressure reducing valve 250 is biased to the position illustrated in FIG. 12, which is a constant reduced pressure position wherein branch line 252 is communicated with line 256, while no communication is established for line 254. When pressure reducing valve 250 is shifted to an intermediate position part way down from the position in FIG. 12, lines 252 and 254 are communicated with line 256 via restricted passages in pressure reducing valve 250. In a fully shifted position all the way down from the illustrated position in FIG. 12, only line 254 is communicated with line 256 for full relief to tank 182, while line 252 is closed. A pilot line 258 is connected between line 256 and the "upper" end of pressure reducing valve 250 viewing FIG. 12, and a second pilot line 260 is connected between line 254 and the "bottom" end of pressure reducing valve 250 viewing FIG. 12. One suitable such pressure reducing valve 250 is available from Sun Hydraulics Corporation of Lenexa, Kans. as model PRDM-XBN electro-proportional, direct-acting, pressure reducing/relieving valve with open transition-high pressure setting with no command.

Operating circuit 176 also includes an arrangement for applying down pressure to the openers 22 during field operations utilizing the blower motor circuit. In this respect, a line 262 connects line 252 with opener branch line 188 at a point between opener valve 198 and the base ends of opener cylinders 80, 82, 174. Another line 264 connects line 254 with opener branch line 214 at a point between second opener valve 224 and the rod ends of opener cylinders 80, 82, 174. A manually settable pressure reducing valve 266 and a normally closed, electrically actuable solenoid valve 268 are connected in series flow relationship within line 262, with the electrically actuable valve 268 being located between pressure reducing valve 266 and the rod ends of opener cylinders 80, 82, 174. A single normally closed, electrically actuable valve 270 is located within line 264.

Figure 15:
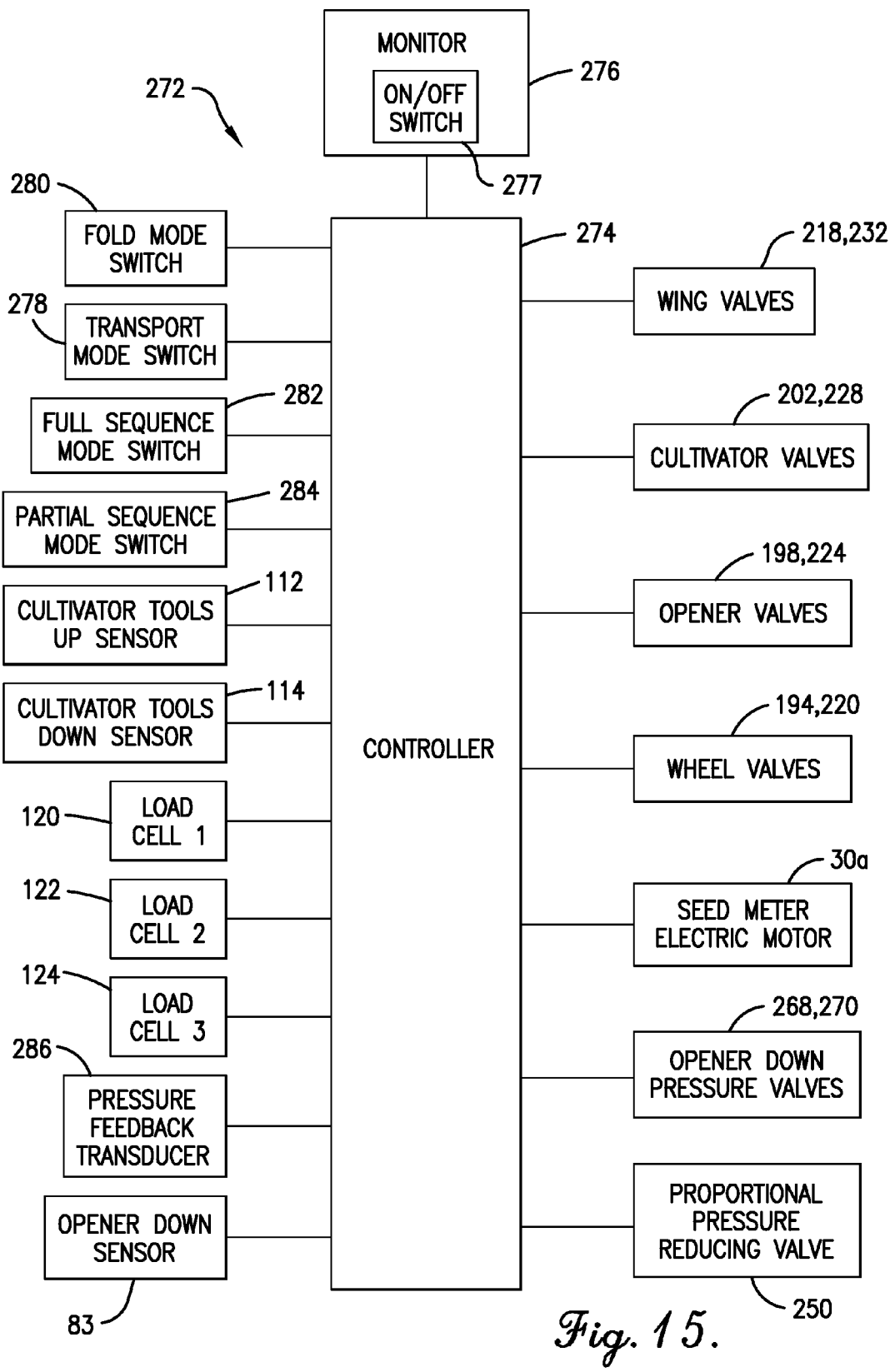
FIG. 15 is a schematic diagram of the electrical control circuit of the seeder.

The seeder also has an electrical control circuit illustrated in FIG. 15 and broadly denoted by the numeral 272 for controlling operation of the hydraulic operating circuit 176. Many of the components of control circuit 272 have previously been described, such as, for example, the cultivator up sensor 112, the cultivator down sensor 114, load cells 120, 122, 124, and the opener down sensor 83. A number of additional components are also included, primary among which is a programmable controller 274 that serves as the "brains" of the control circuit. One suitable such properly programmed controller 274 is available from Mueller Electronics, Inc. of Burr Ridge, Ill. as the DRILL MANAGER ME.

Controller 274 is connected via a CAN bus or ISO bus to a tractor-mounted monitor 276 having a start switch 277, as well as a number of other switches and informational icons. When connected to the programmed controller 274, monitor 276 provides a number of selectable, touch-screen or mechanical mode switches which may be used to toggle between modes and perform other functions after the system is started up in the initial mode by depressing start switch 277. Such selectable mode switches include at least a transport mode switch 278, a fold mode switch 280, and either or both of a cultivator full sequence mode switch 282 and a cultivator partial sequence mode switch 284. Inputs into controller 274 are made by the cultivator up sensor 112, the cultivator down sensor 114, load cells 120, 122, 124, the opener down sensor 83, and a pressure feedback transducer 286 connected to wing cylinder branch line 218 from the base end of wing cylinders 158, 160 as also shown on the operating circuit schematic in FIG. 12. Depending on the particular mode selected by the operator at the time, outputs are made by controller 274 to wing cylinder valves 218 and 232 to actuate those valves simultaneously, to wheel cylinder valves 194 and 220 to actuate those valves simultaneously, to opener cylinder valves 198 and 224 to actuate those valves simultaneously, to cultivator cylinder valves 202 and 228 to actuate those valves simultaneously, to proportional pressure reducing valve 250, and to opener down pressure valves 268, 270 to actuate those valves simultaneously. Controller 274 also activates and deactivates an electric motor 30*a* that drives seed meter 30.

Sequencing Operations

Upon startup by actuating start switch 277, the display on monitor 276 is activated. In this initial mode, none of the valves are powered and no functions are active. The system is then transitioned from the initial mode to the proper state of operation by the operator choosing which function he wishes to engage in and depressing the appropriate mode switch (transport switch 278, fold switch 280, cultivator full sequence switch 282, or cultivator partial sequence switch 284).

The fold mode is applicable when entering or exiting a field and is used for folding or unfolding the wings of the seeder. When the fold mode is selected by depressing fold switch 280, both wing valves 206 and 232 are simultaneously activated to an open condition by controller 274 to energize the fold circuit. No other hydraulic function is available in the fold mode. Assuming the wings are initially in a folded condition with wing cylinders 158, 160 contracted, when the operator then manually shifts (pulls) tractor valve 178 to the left as viewed in FIG. 13, the rod ends of wing cylinders 158, 160 are communicated with tank 182 via branch line 192, open valve 206 and main line 184, while the base ends are communicated with pump 180 via branch line 218, open valve 232 and main line 210. Cylinders 158, 160 therefore gradually extend to lower the wings to the ground. To raise the wings, the operator shifts (pushes) tractor valve 178 in the opposite direction to communicate the rod ends of wing cylinders 158, 160 with pump 180 via branch line 192, open valve 206 and main line 184, while the base ends are communicated with tank 182 via branch line 218, open valve 232 and main line 210. Cylinders 158, 160 therefore gradually retract to raise the wings to their folded condition. When the operator returns tractor valve 178 to the neutral position of FIG. 13, fluid flow ceases.

The transport mode is applicable when preparing the seeder for or exiting from over-the-road travel. When transport mode switch 278 is depressed, both wheel valves 194 and 220 are simultaneously activated to an open condition by controller 274 to activate the wheel lift/lower circuit. No other hydraulic function is available in the transport mode. Assuming the wings have already been folded and the operator wishes to raise the center section 24 for over-the-road travel, after depressing the transport mode switch 278 the operator then manually shifts (pulls) tractor valve 178 to the left viewing FIG. 12 to communicate the pump 180 with the rod ends of wheel cylinders 58, 60, via main line 210, open valve 220 and branch line 212, while their base ends are communicated with tank 182 via branch line 186, open valve 194 and main line 184. Cylinders 58, 60 therefore gradually contract to lower wheels 18*c*, 18*d*, 18*e*, 18*f* relative to center section 24 and raise center section 24 relative to the ground. Once the fixed axle wheels 18*a*, 18*b* have been lifted off the ground with the raised center section 24, the operator may return tractor valve 178 to its neutral position of FIG. 13 and the machine is ready for over-the-road travel, carried by wheels 18*c*-18*f*. To lower the machine back down to a field operating height, after depressing the transport mode switch 278, the operator shifts (pushes) tractor valve 178 to the right viewing FIG. 13 to communicate the rod ends of wheel cylinders 58, 60 with tank 182 via branch line 212, open valve 220 and main line 210, while the base ends are communicated with pump 180 via main line 184, open valve 194 and branch line 186. Cylinders 58, 60 gradually extend to allow wheels 18*c*-18*f* to rise relative to center section 24 and thereby lower center section 24 back down toward the ground. When the operator returns tractor valve 178 to the neutral position of FIG. 13, fluid flow ceases.

The operating and control system of the present invention (operating circuit 176 and control circuit 272) is designed for sequenced raising or lowering of the cultivators 20 and openers 22 during turns in the headland area of a field or the like. In the disclosed embodiment, the operator may select either a full sequence mode, wherein the cultivators 20 and openers 22 are sequenced during both raising and lowering, or a partial sequence mode wherein the cultivators 20 and openers 22 lower simultaneously but raise in sequence. It is within the principles of the present invention to have only one of such modes, however. Once the desired mode as been selected by depressing either the full sequence switch 282 or the partial sequence switch 284, the controller 274 takes over to prepare operating circuit 176 for carrying out the chosen function when the operator shifts tractor valve 178.

In either mode, when controller 274 activates the opener circuit, both opener valves 198, 224 are opened simultaneously. Likewise, when controller 274 activates the cultivator circuit, both cultivator valves 202, 228 are opened simultaneously. Thus, when the operator shifts (pushes) tractor valve 178 to the right viewing FIG. 12 and the controller has opened opener valves 198, 224, the openers 22 lower as the base ends of opener cylinders 80, 82, 174 communicate with pump 180 via main line 184, open valve 198 and branch line 188, while the rod ends communicate with tank 182 via branch line 214, open valve 224 and main line 210. Once the opener down position sensor 83 senses openers 22 are fully lowered, it signals the controller 174 which closes opener valves 198, 224 and stops further extension of opener cylinders 80, 82, 174. When the operator shifts (pulls) tractor valve 178 to the left viewing FIG. 12 to raise openers 22, if controller 274 has opened opener valves 198, 224 the openers 22 are raised as the rod ends of opener cylinders 80, 82, 174 communicate with pump 180 via main line 210, open valve 224 and branch line 214, while the base ends communicate with tank 182 via branch line 188, open valve 198 and main line 184.

Similarly, during such shifting (pushing) of tractor valve 178 to the right, if controller 274 has opened cultivator valves 202, 228, the cultivators 20 lower as the base ends of cultivator cylinders 96, 98, 170, 172 communicate with pump 180 via main line 184, open valve 202 and branch line 184, while the rod ends of cultivator cylinders 96, 98, 170, 172 communicate with tank 182 via branch line 216, open valve 228 and main line 210. When cultivator down sensor 114 senses cultivators 20 are fully lowered, it signals the controller 274 which closes cultivator valves 202, 228 and stops further extension of cultivator cylinders 96, 98, 170, 172. During shifting (pulling) of tractor valve 178 to the left for raising cultivators 20, if controller 274 has opened cultivator valves 202, 228, the cultivators are raised as the rod ends of cultivator cylinders 96, 98, 170, 172 communicate with pump 180 via open valve 228 and main line 210, while the base ends of cultivator cylinders 96, 98, 170, 172 communicate with tank 182 via open valve 202 and main line 184. When cultivator up sensor 112 senses cultivators 20 are fully raised, it signals the controller 274.

Figure 13:
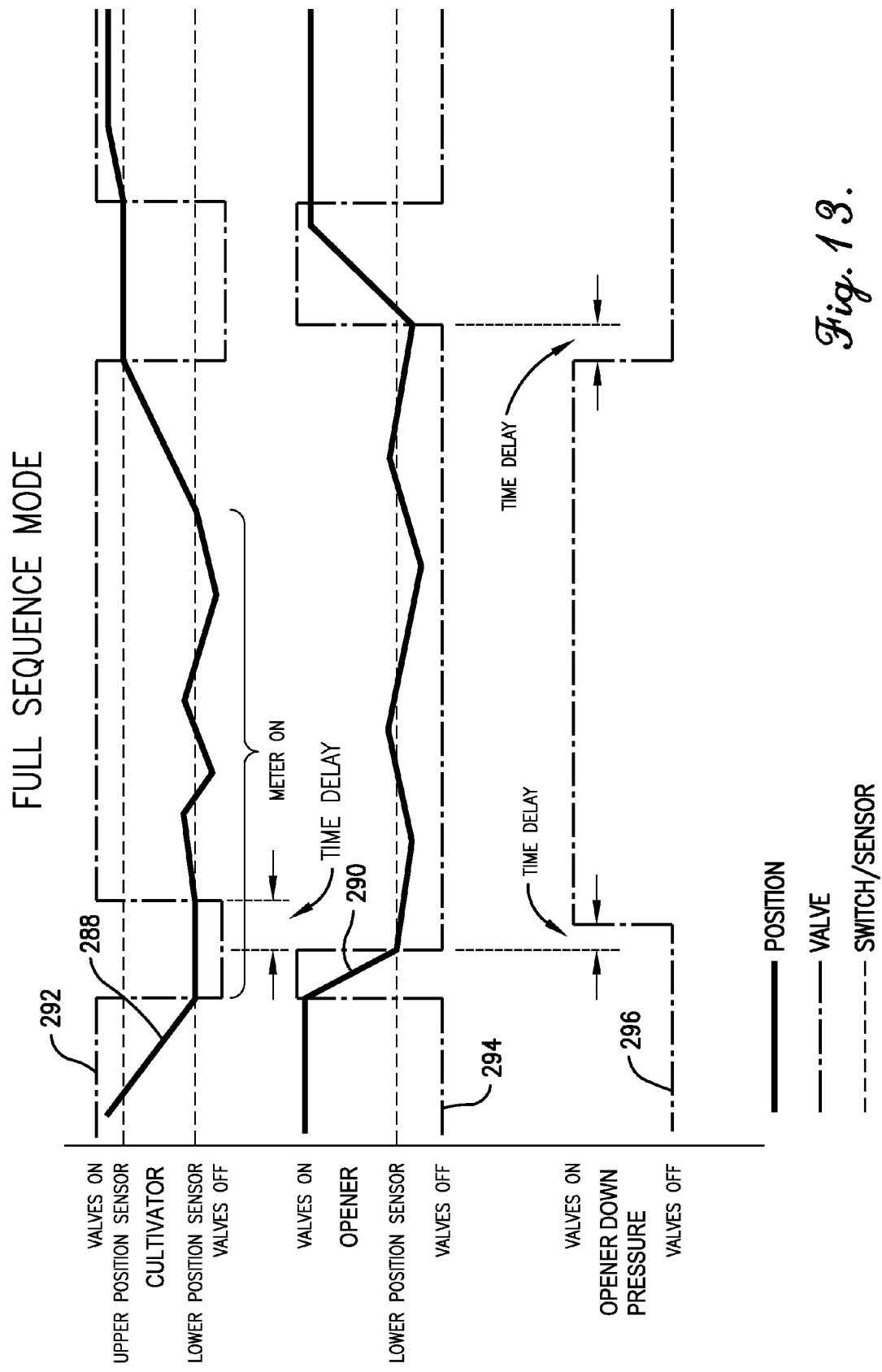
FIG. 13 is a diagram illustrating sequential operation of the cultivators and openers when the full sequence mode is selected by the operator.
Figure 14:
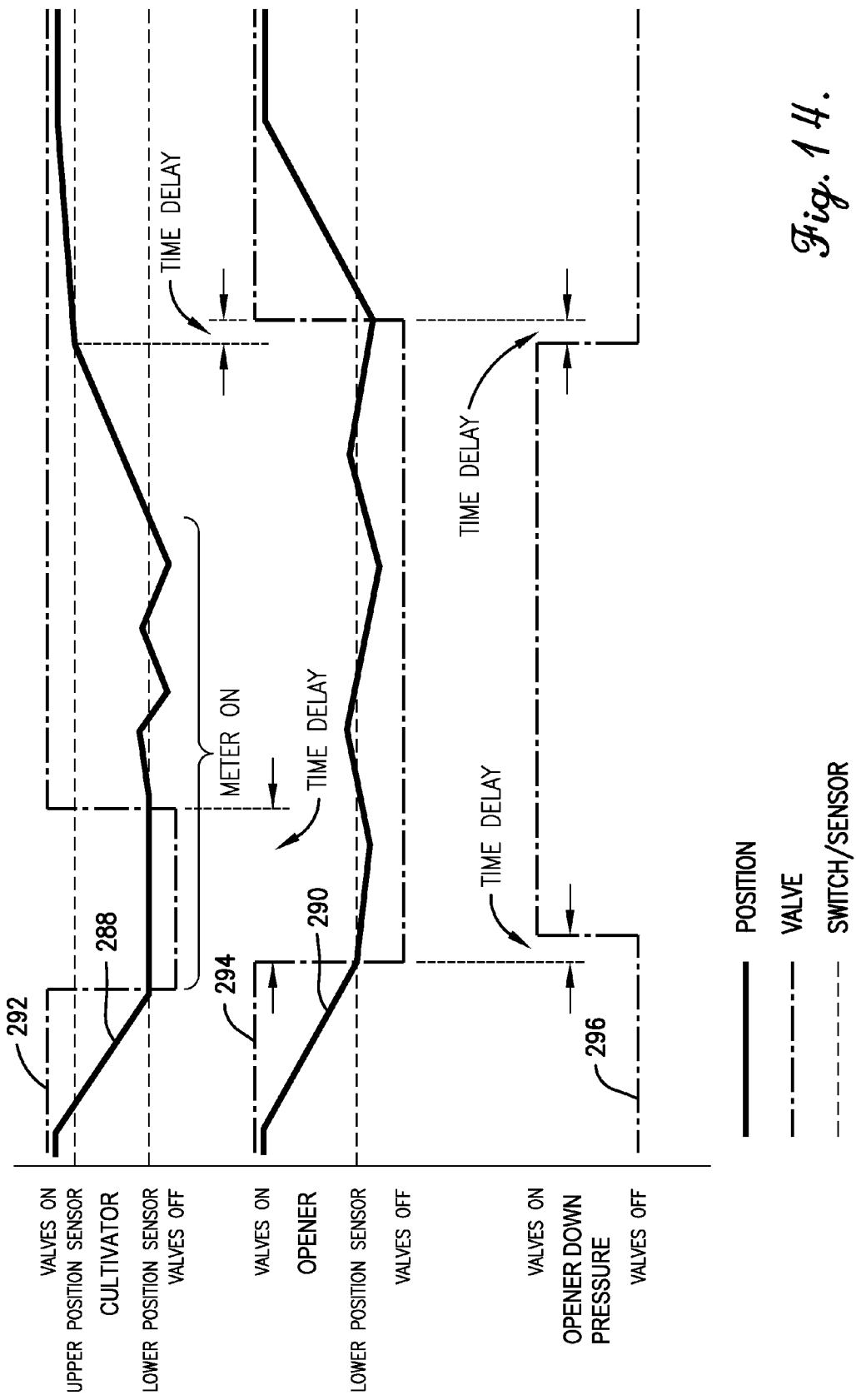
FIG. 14 is a diagram illustrating sequential operation of the cultivators and openers when the partial sequence mode is selected by the operator.

The sequential operation of cultivators 20 and openers 22 in the full and partial sequence modes is illustrated in the diagrams of FIGS. 13 and 14. In both diagrams, the heavy solid line 288 represents cultivator position as a function of time, while the heavy solid line 290 represents opener position as a function of time. In both diagrams, broken line 292 represents the condition of the cultivator valves 202, 228 as a function of time, while broken line 294 represents the condition of opener valves 198, 224 as a function of time. In both diagrams, broken line 296 represents the condition of the opener down pressure valves 268, 270 as a function of time.

If the operator has selected the full sequence mode of FIG. 13 by depressing full sequence switch 282, when tractor valve 178 is shifted to the lowering position for lowering cultivators 20 and openers 22, the controller 274 causes cultivators 20 to be lowered first. When lower cultivation position sensor 114 detects that cultivators 20 have been fully lowered, it signals controller 274, which closes cultivator valves 202, 228 to stop lowering cultivators 20, opens opener valves 198, 224 to start lowering openers 22, and activates meter motor 30a to start dispensing seeds from hopper 28. When lower opener position switch 83 detects that openers 22 have been fully lowered, it signals controller 274, which recloses opener valves 198, 224. Opener valves 198, 224 remain closed until a later raising sequence. Cultivator valves 202, 228 are reopened by controller 274 after a predetermined time delay measured from their closing point and remain open until the next time the cultivators have been raised. The meter motor 30a remains activated until the cultivators 20 leave their fully lowered position during a raising sequence.

When the operator wants to raise cultivators 20 and openers 22 from their lowered positions when in the full sequence mode, he shifts tractor valve 178 to the raising position. Cultivator valves 202, 228 are still open at this point, so cultivators 20 immediately begin to lift and continue such movement until the cultivator up position sensor 112 detects their arrival at the fully raised position. Meter motor 30a shuts off as cultivators 20 start to rise. Upon arrival of the cultivators 20 at their raised position, the cultivator up position sensor 112 signals the controller 274, which closes cultivator valves 202, 228 for a predetermined period of time and (after a short delay) activates opener valves 198, 224. Openers 20 rise from their lowered positions until opener cylinders 80, 82, 174 reach their stroke limit. When the time delay elapses for the closed cultivator valves 202, 228, controller 274 reopens cultivator valves 202, 228 and recloses opener valves 202, 228. If the operator continues to hold tractor valve 178 in the raising position after cultivator valves 202, 228 are reopened, the cultivators 20 can rise somewhat further until the stroke limit of cultivator cylinders 96, 98, 170, 172 is reached.

It will thus be seen that in the full sequence mode, the operator can avoid seeding problems previously experienced during headland turns and the like when cultivators and openers were both raised simultaneously and lowered simultaneously. In the full sequence mode, as the farmer approaches the headland and wants to raise the cultivators 20 and openers 22 for the turn around, he shifts the tractor valve 178 to the raising position, causing the cultivators to immediately lift from the ground and stop cultivating. Meter 30 shuts off as well, but the blower 36 keeps sending seeds that remain in the system to the openers 22, which stay down at this time and keep depositing the left-over seeds into the ground as the seeder continues to advance. Shortly after the cultivators 20 reach their raised position, the openers 22 start to rise to terminate seeding operations and then remain raised with the cultivators 20 while the operator completes his turn around. By sequencing raising of the cultivators 20 and openers 22 in this way, the openers 22 are not raised prematurely.

After getting properly positioned for the next pass, the operator starts down the rows and shifts tractor valve 178 to the lowering position. Cultivators 20 immediately lower into their ground working positions to start their cultivation function, but openers 22 remain raised and meter motor 30a remains off until the cultivators 20 reach their lowered position. Once the cultivators are in their lowered position, the meter motor 30a is activated and openers 22 commence their lowering movement. Thus, no seeds are deposited until the rear of the seeder has moved out of the headland and into the newly cultivated soil of the next pass.

The partial sequence mode of FIG. 14 produces an outcome similar to that of the full sequence mode with respect to raising, but not lowering. In the partial sequence mode the cultivators 20 and the openers 22 are raised in sequence, with the cultivators 20 raising first, but they are lowered simultaneously. Thus, as illustrated in the partial sequence mode diagram of FIG. 14, if the operator has depressed partial sequence switch 284, when tractor valve 178 is shifted to the lowering position the controller 274 causes opener valves 198, 224 to open (cultivator valves 202, 228 are already open), and both the cultivators 20 and openers 22 lower simultaneously. When lower cultivation position sensor 114 detects that cultivators 20 are fully lowered, controller 274 closes cultivator valves 202, 228 for a predetermined time delay and meter motor 30a is activated. When opener down position sensor 83 detects that openers 22 are in their lowered position, controller 274 closes opener valves 198, 224 and keeps them closed until the next opener raising cycle. Cultivator valves 202, 228 are reopened by controller 274 after the expiration of the time delay, and they remain open throughout the next raising sequence and until the next lowering operation. The meter motor 30a remains activated until cultivators 20 leave their lowered position during the next raising sequence.

When the operator wants to raise cultivators 20 and openers 22 from their lowered positions when in the partial sequence mode, he shifts tractor valve 178 to the raising position. Cultivation valves 202, 228 are in an open condition at this time, so cultivators 20 immediately begin to lift until the cultivator up position sensor 112 detects their arrival at the raised position. Meter motor 30a shuts off as cultivators 20 start to rise. Upon arrival of cultivators 20 at their raised position, the cultivator up position sensor 112 signals the controller 274, which, after a short delay, activates opener valves 198, 224 to cause openers 22 to rise until opener cylinders 80, 82, 174 reach their stroke limits. Opener valves 198, 224 remain open, along with cultivator valves 202, 228, until the completion of the next lowering cycle.

It will thus be seen that in the partial sequence mode, the operator can still achieve the benefits of delayed raising of the openers as he approaches the headland and prepares for a turn. Even though the cultivators 20 are lifting and the meter motor 30a has been deactivated, seeds in the system continue to be delivered to the openers 22, and the openers continue to deposit them in the soil, until the cultivators have been raised. Once the operator has completed his turn around and is ready to start back down the rows in the next pass, the cultivators 20 and the openers 22 are lowered simultaneously when he shifts the tractor valve to the lowering position, and the meter motor 30a is reactivated when the cultivators reach their lowered positions.

Opener Down Pressure

It is desirable to apply hydraulic down pressure to the openers 22 when they are in their lowered positions engaging the ground. This is accomplished by utilizing pressure (with little flow) from the blower motor circuit (controlled by second tractor valve 240) as long as the pressure in that circuit is high enough to continue to support operation of blower motor 36a. The components of operating circuit 176 for carrying out the application of down pressure to opener cylinders 80, 82, 174 are the manually settable pressure reducing valve 266 and solenoid valves 268, 270 (controlled by controller 274).

The operator manually adjusts valve 266 so that it does not allow pressure seen by the base ends of opener cylinders 80, 82, 174 to exceed a selected level, thereby maintaining sufficient pressure in the blower motor circuit to satisfactorily operate blower motor 36a. If valves 268, 270 are open (by controller 274), pressure from blower motor main line 236 communicates with the base ends of opener cylinders 80, 82, 174 in an effort to extend the cylinders, thus pushing openers 22 against the ground. The ground, of course, resists such extension and, therefore, there is little flow but sufficient pressure to keep the openers 22 fully pressed down into the soil. The opened valve 270 communicates the rod ends of opener cylinders 80, 82, 174 with tank 182 via lines 214, 264, 254, and main line 238. When valves 268, 270 are closed (by controller 274), valve 266 remains open, but there can be no communication of blower motor main line 236 with opener cylinders 80, 82, 174.

Controller 274 is programmed to only open valves 268, 270 in the full sequence mode or the partial sequence mode, and then only when the openers 22 are in their lowered positions. As illustrated in the full sequence mode diagram of FIG. 13, for example, down pressure valves 268, 270 are off (closed) unless cultivators 20 and openers 22 are in their lowered positions. Once openers 22 are in their lowered position, the opener down position sensor 83 signals such condition to controller 274 and, following a short time delay, controller 274 causes down pressure valves 268, 270 to turn on (open). Down pressure valves 268, 270 remain on (open) until the next time cultivators 20 are raised to their raised position, at which time the cultivator up position sensor 112 signals controller 274 that cultivators 20 are raised. Controller 274 immediately turns off (closes) down pressure valves 268, 270, and after a short time delay the controller 274 causes the openers 22 to commence their raising movement. Opener down pressure valves 268, 270 remain off (closed) until completion of the next lowering cycle of the openers 22. Similarly, in the partial sequence mode, the opener down pressure valves 268, 270 only come on (open) following a short time delay after the opener down position sensor 83 signals controller 274 that the openers 22 have reached their lowered position. The opener down pressure valves 268, 270 then turn off (close) when cultivator up position sensor 112 signals controller 274 that cultivators 20 are raised in their raised position.

Hopper Weighing to Perform Control Functions

The weight of hopper 28 throughout field operation is determined by load cells 120, 122, 124 in conjunction with controller 274 and may be used to perform various control functions on the seeder. For example, in addition to a direct display to the operator of the weight at any point in time, and the activation of alarms when the hopper is full or becomes empty, the decreasing weight read by the load cells as the volume of seeds reduces in the hopper can be used to calculate the actual amount of product applied over a given area, which is then compared with the intended amount. If a deviation between the two values is greater than a set point, an error message can be displayed on the monitor 276. Another use of the weight information is to calculate and display the estimated time of depletion, based upon the rate of depletion determined by comparing the weight at known time intervals. A further control function performed using hopper weight information is adjusting (reducing) the down pressure applied to the ground wheels of the wing sections as the hopper lightens so as to keep the compaction pressure applied by the wing section wheels to the cultivated soil substantially the same as that applied by the center section wheels throughout field operations. Without such adjustment, the compaction pressure applied by the center section wheels would decrease as the hopper lightens due to seed depletion, while the compaction pressure applied by the wing section wheels would remain substantially unchanged. This could result in unequal planting depths, uneven seed emergence and other undesirable outcomes.

In the illustrated embodiment, the controller 274 is programmed such that wing wheel down pressure can only be adjusted during the full sequence mode or the partial sequence mode, i.e., when neither the transport mode nor the fold mode is selected. With reference to FIG. 12, when the wing cylinders 158, 160 are in their extended positions with the wing wheels 18g, 18h, 18i and 18j, 18k, 181 engaging the ground, wing valves 206, 232 are closed. Instantaneous weight information from load cells 120, 122, 124 is continuously signaled to controller 274, as is instantaneous pressure information from the pressure transducer 286 that is in continuous communication with the base end of wing cylinders 158, 160. If controller 274 determines at any time during such continuous measurement that the value for the detected net weight of hopper 28 results in a sufficient disparity with the value for the wing down pressure at the base ends of wing cylinders 158, 160, controller 274 causes pressure reducing valve 250 to shift a proportional amount and allow the base ends of wing cylinders 158, 160 a degree of communication with tank 182 via lines 218, 256, 254, and 238. Passage through the proportionally shifted valve 250 is restricted by the restricted orifices within such valve. This results in a small pressure reduction at the base ends of wing cylinders 158, 160 and enables the upwardly directed ground forces to cause a corresponding small retraction of wing cylinders 158, 160. Such retraction of wing cylinders 158, 160 results in a small amount of fluid being drawn into the rod ends of cylinders 158, 160 from the blower motor circuit via lines 192 and 238. Controller 274 permits such drawing of fluid from the blower motor circuit only if the blower function would not be compromised, i.e., only if the motor speed exceeds a predetermined level such as, for example, 1000 rpm. In the event that a larger disparity in the weight value and the pressure value is determined by controller 274, controller 274 causes proportional valve 250 to shift to its full relief position wherein the internal restricted orifices of valve 250 are bypassed and line 256 is connected directly with line 254 and main line 238 of the blower motor circuit to the tank 182.

It has been found that the following equation satisfactorily controls the pressure reduction function but is dependent in part upon the size and weight of the seeder 10:

$$P = (W/K1) + K2$$

Where:
P=pressure needed (psi), W=net weight measured (lbs), and K1 and K2 are constants.

In a seeder that is six meters in overall width, satisfactory results have been achieved where K1=14 and K2=115. The values for K1 and K2 change, depending upon the size and weight of the seeder.

The controller 274 and/or functions thereof may be embodied in software, in hardware, or in a combination thereof. In various embodiments, the controller 274 and/or functions thereof may be embodied as computer readable codes on a computer readable recording medium to perform tasks such as processing and calculation operations, such as processing the weight and down pressure data and calculating an appropriate response. The computer readable recording medium may include any data storage device suitable to store data that can be read by a computer system. A non-exhaustive list of possible examples of computer readable recording mediums include read-only memory (ROM), random-access memory (RAM), CD-ROMS, magnetic tapes, floppy disks, optical storage devices, and carrier waves such as data transmission via the internet. The computer readable recording medium may also be distributed over network-coupled computer systems so that the computer readable code is stored and executed in a distribution fashion.

The inventors hereby state their intent to rely on the Doctrine of Equivalents to determine and assess the reasonably fair scope of the present invention as it pertains to any apparatus not materially departing from but outside the literal scope of the invention as set forth in the following claims.

The invention claimed is:

1. A method of seeding comprising:
    making a plurality of seeding passes across a field using a mobile frame;
    cultivating the ground during each seeding pass using a set of cultivators mounted on said frame and disposed in a lowered position as said frame traverses the ground;
    opening furrows in the cultivated ground during each seeding pass using a set of openers mounted on said frame in a lowered position behind said cultivators;
    metering seeds from a seed meter into an air stream that delivers seeds to said openers during each seeding pass and depositing seeds in the furrows with said openers as said frame traverses the ground;
    as said mobile frame approaches a headland at an end of a seeding pass, raising said cultivators and said openers out of the ground sequentially and into raised positions in such a manner that said cultivators are raised first and said openers are raised after said cultivators,
    said raising step including controlling the position of said cultivators and said openers in a manner to cause raising of said cultivators out of the ground while continuing said opening and depositing steps by said openers in their lowered position until said cultivators reach their fully raised position,
    said raising of said openers from their lowered position commencing only after said cultivators have first reached their raised position; and
    terminating said metering of seeds into said air stream by said seed meter when said cultivators commence raising toward their raised position from their lowered position.

2. A method of seeding as claimed in claim 1,
    said controlling step including using a controller programmed in a manner to cause raising of the openers out of the ground after said cultivators have been raised.

3. A method of seeding as claimed in claim 2,
    further comprising, as said mobile frame leaves a headland and starts another seeding pass, using said controller to cause returning of said cultivators into the ground before returning said openers into the ground.

4. A method of seeding as claimed in claim 2,
    further comprising, as said mobile frame leaves a headland and starts another seeding pass, using said controller to cause simultaneous lowering of both said cultivators and said openers toward the ground.

5. A cultivation air seeder comprising:
    a plurality of cultivators for working the ground in preparation for seed deposit;
    a hydraulic cultivator cylinder operably coupled with said cultivators for raising said cultivators from a lowered position in which said cultivators engage the ground to a raised position in which said cultivators are out of engagement with the ground;
    a plurality of openers behind said cultivators for preparing seed furrows and depositing seeds into the furrows when said openers are engaging the ground;
    a hydraulic opener cylinder operably coupled with said openers for raising said openers from a lowered position in which said openers engage the ground to a raised position in which said openers are out of engagement with the ground;
    a hydraulic line connectable to a source of pressurized fluid;
    a cultivator valve operable when open to connect said cultivator cylinder with said hydraulic line for causing said cultivator cylinder to operate in a raising stroke when said hydraulic line is connected to a source of pressurized fluid and operable when closed to disconnect said cultivator cylinder from said hydraulic line;
    an opener valve operable when open to connect said opener cylinder with said hydraulic line for causing said opener cylinder to operate in a raising stroke when said hydraulic line is connected to a source of pressurized fluid and operable when closed to disconnect said opener cylinder from said hydraulic line; and
    a controller connected to said cultivator valve and said opener valve in a manner for causing said cultivators and said openers to be raised sequentially with the cultivators being raised first and said openers being raised second,
    said controller being programmed to maintain said cultivator valve open and said opener valve closed until said cultivators reach their raised position and then maintain said cultivator valve closed and said opener valve open until said openers reach their raised position such that pressurized fluid in said lift circuit is not used to raise said openers until said cultivators have first been raised to their raised position.

6. A cultivation air seeder as claimed in claim 5,
    further comprising a seed meter operable when activated to meter seeds into an air stream that delivers seeds to said openers,
    said controller being connected to said seed meter and programmed in a manner to deactivate said seed meter and thereby terminate metering of seeds into said air stream when said cultivators commence raising toward their raised position from their lowered position.

7. A cultivation air seeder as claimed in claim 6,
    said controller being programmed to reactivate said seed meter when said cultivators have been returned to their lowered position.

8. A cultivation air seeder as claimed in claim 5,
    said cultivators and said openers being lowerable from their raised positions to their lowered positions,
    said controller being programmed to cause lowering of said cultivators to their lowered position before lowering of said openers to their lowered position.

9. A cultivation air seeder as claimed in claim 5,
said cultivators and said openers being lowerable from their raised positions to their lowered positions,
said controller being programmed to cause said cultivators and said openers to be simultaneously lowered from their raised positions to their lowered positions.

10. An air seeder comprising:
a seed hopper;
at least one opener for preparing a furrow in the ground and depositing seeds from said hopper into the furrow when said opener is engaging the ground;
a blower for generating a stream of air used in transporting seeds from said hopper to said opener,
said blower including a rotary hydraulic motor for driving the blower;
a blower motor circuit connected in fluid communication with said blower motor for supplying hydraulic fluid under pressure to said blower motor;
a hydraulic opener actuator operably coupled with said opener for shifting said opener between a lowered position in which said opener engages the ground and a raised position in which said opener is out of engagement with the ground;
a hydraulic main line connectable into and out of fluid communication with said opener actuator,
said main line being operable when connected in fluid communication with said opener actuator to supply hydraulic fluid under pressure to said opener actuator for use in shifting said opener between said raised and lowered positions;
a hydraulic down pressure line operable when open to connect said opener actuator in fluid communication with said blower motor circuit; and
a controller programmed to disconnect said main line from said opener actuator and open said down pressure line only when said opener is in said lowered position for supplying down pressure from said blower motor circuit to said opener actuator.

* * * * *